United States Patent [19]

Ravichandran et al.

[11] Patent Number: 5,977,219
[45] Date of Patent: Nov. 2, 1999

[54] BENZOTRIAZOLE UV ABSORBERS HAVING ENHANCED DURABILITY

[75] Inventors: Ramanathan Ravichandran, Nanuet; Anthony David Debellis, Garnerville; Revathi Iyengar, Cortland Manor; Joseph Suhadolnik, Yorktown Heights, all of N.Y.; Jean-Pierre Wolf, Courtaman, Switzerland; Robert Edward Detlefsen, Putnam Valley; Mervin Gale Wood, Poughquag, both of N.Y.

[73] Assignee: Ciba Specialty Chemicals Corporation, Tarrytown, N.Y.

[21] Appl. No.: 08/961,127

[22] Filed: Oct. 30, 1997

[51] Int. Cl.$^6$ .............................. C08K 5/34; C08K 5/36; C08K 5/09
[52] U.S. Cl. .......................... 524/91; 524/100; 524/102; 524/141; 524/222; 524/228; 524/289; 524/291; 524/339
[58] Field of Search ........................... 524/91, 100, 102, 524/141, 222, 228, 289, 291, 339

[56] References Cited

U.S. PATENT DOCUMENTS

| | | | |
|---|---|---|---|
| 4,082,679 | 4/1978 | Rhodes | 428/378 |
| 4,226,763 | 10/1980 | Dexter et al. | 548/257 |
| 4,275,004 | 6/1981 | Winter et al. | 548/260 |
| 4,278,589 | 7/1981 | Dexter et al. | 548/260 |
| 4,315,848 | 2/1982 | Dexter et al. | 428/522 |
| 4,347,180 | 8/1982 | Winter et al. | 534/582 |
| 4,868,246 | 9/1989 | MacLeay et al. | 525/142 |
| 5,278,314 | 1/1994 | Winter et al. | 548/259 |
| 5,280,124 | 1/1994 | Winter et al. | 548/259 |
| 5,360,850 | 11/1994 | Moshichitsky et al. | 524/91 |
| 5,436,349 | 7/1995 | Winter et al. | 548/259 |
| 5,516,914 | 5/1996 | Winter et al. | 548/259 |
| 5,554,760 | 9/1996 | Winter et al. | 548/269 |
| 5,563,242 | 10/1996 | Winter et al. | 524/91 |
| 5,574,166 | 11/1996 | Winter et al. | 548/260 |
| 5,607,987 | 3/1997 | Winter et al. | 524/91 |
| 5,646,088 | 7/1997 | Hada et al. | 503/209 |

FOREIGN PATENT DOCUMENTS

| | | |
|---|---|---|
| 453396 | 3/1991 | European Pat. Off. . |
| 0593936 | 4/1994 | European Pat. Off. . |
| 698637 | 2/1996 | European Pat. Off. . |
| 750224 | 12/1996 | European Pat. Off. . |
| 1670951 | 11/1967 | Germany . |

OTHER PUBLICATIONS

Patent Announcement by the Patent Office of the Government of Japan, Appln. No. Shawa 42(1967) 42052.
J L. Gerlock, et al, Proc. 36$^{th}$ annual Tech. Sym. Cleveland Coating Society, May 18, 1993.
Vysokomol Ioedin, Ser. A. (18)(3), 553 (1976.
J. E. Pickett, et al. Angew. Makromol. Chem. 232, 229 (1995).

*Primary Examiner*—Kriellion S. Morgan
*Attorney, Agent, or Firm*—Luther A. R. Hall

[57] ABSTRACT

Benzotriazole UV absorbers which are substituted at the 5-position of the benzo ring by an electron withdrawing group exhibit enhanced durability and very low loss rates when incorporated into automotive coatings.

14 Claims, No Drawings

BENZOTRIAZOLE UV ABSORBERS HAVING ENHANCED DURABILITY

Benzotriazole UV absorbers being substituted in the benzo ring by electron withdrawing moieties exhibit enhanced durability and low loss rates when incorporated into automotive coatings.

BACKGROUND OF THE INVENTION

The benzotriazoles have long been an important class of UV absorbers and have gained wide commercial importance and acceptance for many industrial applications. The prior art is replete with references to their manufacture and utility. However, as requirements become ever more stringent and demanding, the search for still more stable and durable benzotriazoles continues. The gradual phase out of HAPS solvents, such as xylene, because of environmental concerns and their replacement with non-HAPS solvents, such as esters, ethers or ketones, and increased durability requirements for automotive coatings make this search more urgent. Indeed, the automotive industry is most concerned about UVA losses from automotive paints and coatings as seen in the publication by J. L. Gerlock et al., Proc. 36th Annual Tech. Sym. (Cleveland Coating Society), May 18, 1993.

Vysokomol Soedin, Ser. A, 18(3), 553 (1976) describes the linear dependence of hydrogen bond strength and photostability in benzotriazoles.

J. E. Pickett et al., Angew. Makromol. Chem. 232, 229 (1995) describe the photodegradation of benzotriazole UV absorbers in poly(methyl methacrylate) films. Structural variation generally caused only small differences in the rates of degradation unless the substitution disrupted the intramolecular hydrogen bonds which are critical for stability. Pickett et al. did not test any benzotriazoles containing both electron withdrawing and electron donating groups as in the instant invention.

The prior art leads one to the conclusion that strengthening the hydrogen bond leads to a more stable benzotriazole, but does not teach how this can be accomplished. The instant invention discloses benzotriazoles which exhibit enhanced durability, but surprisingly this enhanced durability is not always related to greater hydrogen bond strength. Indeed, compounds with enhanced durability often have weaker, not stronger hydrogen bonds U.S. Pat. Nos. 4,226,763; 4,278,589; 4,315,848; 4,275,004; 4,347,180; 5,554,760; 5,563,242; 5,574,166 and 5,607,987 describe selected benzotriazoles, substituted in the 3-position of the hydroxyphenyl ring by an α-cumyl group, which show very. good durability in automotive coatings. These benzotriazoles represent the present state of the art. The instant invention is directed at preparing benzotriazoles which exhibit still better durability and low loss rates from the prior art benzotriazoles.

U.S. Pat. Nos. 5,278,314; 5,280,124; 5,436,349 and 5,516,914 describe red-shifted benzotriazoles. These benzotriazoles are substituted in the 5-position of the benzo ring by thio ethers, alkylsulfonyl or phenylsulfonyl moieties. Red-shifting the benzotriazoles is desirable for spectral reasons. A group at the 5-position which is also electron withdrawing provides additional benefits in low loss rates and durability as found in the instant invention.

DETAILS OF THE DISCLOSURE

The instant invention pertains to benzotriazole UV absorbers having enhanced stability and durability and a low loss rate when incorporated into automotive coatings.

More particularly, the instant invention pertains to a coating composition, stabilized with a benzotriazole, which benzotriazole exhibits enhanced durability and a low loss rate when incorporated in said coating, which composition comprises (a) a resin selected from the group consisting of a thermoset acrylic melamine resin, an acrylic urethane resin, an epoxy carboxy resin, a silane modified acrylic melamine, an acrylic resin with carbamate pendant groups crosslinked with melamine or an acrylic polyol resin crosslinked with melamine containing carbamate groups, and (b) 0.01 to 5% by weight, based on resin solids, of a benzotriazole of formula A, B, C or D

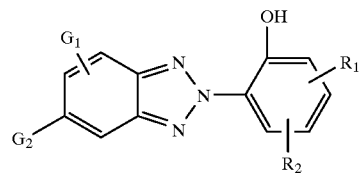

(A)

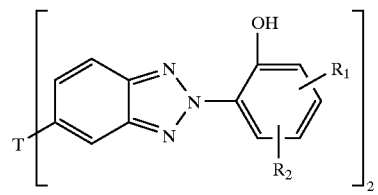

(B)

-continued

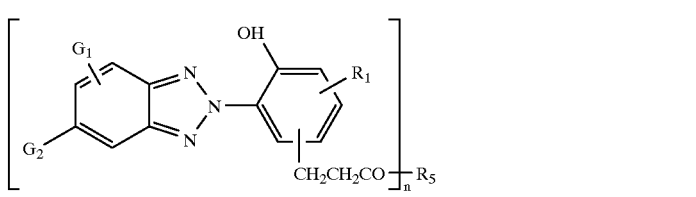
(C)

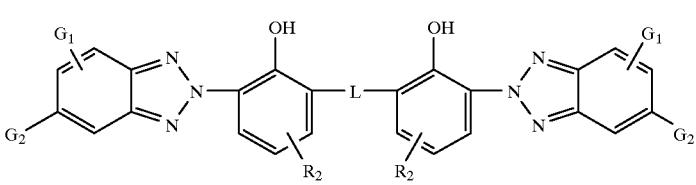
(D)

wherein
$G_1$, $G_2$ or T is an electron withdrawing radical,
$G_1$ is hydrogen or halogen,
$G_2$ is halogen, nitro, cyano, $R_3SO—$, $R_3SO_2—$, $—COOG_3$, $CF_3—$, $—P(O)(C_6H_5)_2$, $—CO—G_3$, $—CO—NH—G_3$, $—CO—N(G_3)_2$, $—N(G_3)—CO—G_3$,

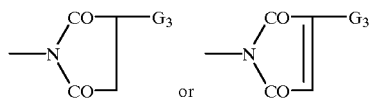

$G_3$ is hydrogen, straight or branched chain alkyl of 1 to 24 carbon atoms, straight of branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $R_1$ is hydrogen, straight or branched chain alkyl of 1 to 24 carbon atoms, straight of branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $R_2$ is straight or branched alkyl chain of 1 to 24 carbon atoms, straight or branched alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $R_2$ is hydroxyl or $—OR_4$ where $R_4$ is straight or branched chain alkyl of 1 to 24 carbon atoms; or said alkyl substituted by one or more $—OH$, $—OCO—R_{11}$, $—OR_4$, $—NCO$ or $—NH_2$ groups or mixtures thereof; or said alkyl or said alkenyl interrupted by one or more $—O—$, $—NH—$ or $—NR_4—$ groups or mixtures thereof and which can be unsubstituted or substituted by one or more $—OH$, $—OR_4$ or $—NH_2$ groups or mixtures thereof; or $R_2$ is $—SR_3$, $—NHR_3$ or $—N(R_3)_2$; or $R_2$ is

wherein
X is $—O—$ or $—N(R_{16})—$,
Y is $—O—$ or $—N(R_{17})—$,
Z is $C_2–C_{12}$-alkylene, $C_4–C_{12}$-alkylene interrupted by one to three nitrogen atoms, oxygen atoms or a mixture thereof, or is $C_3–C_{12}$-alkylene, butenylene, butynylene, cyclohexylene or phenylene, each substituted by a hydroxyl group,
m is zero, 1 or 2, p is 1, or p is also zero when X and Y are $—N(R_{16})—$ and $—N(R_{17})—$, respectively,
$R_{15}$ is a group $—CO—C(R_{18})=C(H)R_{19}$ or, when Y is $—N(R_{17})—$, forms together with $R_{17}$ a group $—CO—CH=CH—CO—$, wherein $R_{18}$ is hydrogen or methyl, and $R_{19}$ is hydrogen, methyl or $—CO—X—R_{20}$, wherein $R_{20}$ is hydrogen, $C_1–C_{12}$-alkyl or a group of the formula.

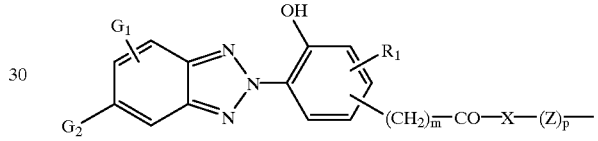

wherein the symbols $R_1$, $R_3$, X, Z, m and p have the meanings defined above, and $R_{16}$ and $R_{17}$ independently of one another are hydrogen, $C_1–C_{12}$-alkyl, $C_3–C_{12}$-alkyl interrupted by 1 to 3 oxygen atoms, or is cyclohexyl or $C_7–C_{15}$aralkyl, and $R_{16}$ together with $R_{17}$ in the case where Z is ethylene, also forms ethylene,
n is 1 or 2,
when n is 1, $R_5$ is Cl, $OR_6$ or $NR_7R_8$, or
$R_5$ is $—PO(OR_{12})_2$, $—OSi(R_{11})_3$ or $—OCO—R_{11}$, or straight or branched chain $C_1–C_{24}$alkyl which is interrupted by $—O—$, $—S—$ or $—NR_{11}$, and which can be unsubstituted or substituted by $—OH$ or $—OCO—R_{11}$, $C_5–C_{12}$ cycloalkyl which is unsubstituted or substituted by $—OH$, straight chain or branched $C_2–C_{18}$alkenyl which is unsubstituted or substituted by $—OH$, $C_7–C_{15}$aralkyl, $—CH_2—CHOH—R_{13}$ or glycidyl,
$R_6$ is hydrogen, straight or branched chain $C_1–C_{24}$alkyl which is unsubstituted or substituted by one or more OH, $OR_4$ or $NH_2$ groups, or $—OR_6$ is $—(OCH_2CH_2)_wOH$ or $—(OCH_2CH_2)_wOR_{21}$ where w is 1 to 12 and $R_{21}$ is alkyl of 1 to 12 carbon atoms,
$R_7$ and $R_8$ are independently hydrogen, alkyl of 1 to 18 carbon atoms, straight or branched chain $C_3–C_{18}$alkyl which is interrupted by $—O—$, $—S—$ or $—NR_{11}—$, $C_5–C_{12}$cycloalkyl, $C_6–C_{14}$aryl or $C_1–C_3$hydroxylalkyl, or $R_7$ and $R_8$ together with the N atom are a pyrrolidine, piperidine, piperazine or morpholine ring,
when n is 2, $R_5$ is one of divalent radicals $—O—R_9—O—$ or $—N(R_{11})—R_{10}—N(R_{11})—$,
$R_9$ is $C_2–C_8$alkylene, $C_4–C_8$alkenylene, $C_4$alkynylene, cyclohexylene, straight or branched chain $C_4–C_{10}$alkylene which is interrupted by $—O—$ or by $—CH_2—CHOH—CH_2—O—R_{14}—O—CH_2—CHOH—CH_2—$,
$R_{10}$ being straight or branched chain $C_2–C_{12}$alkylene which may be interrupted by $—O—$, cyclohexylene, or

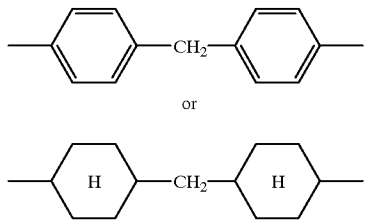

or

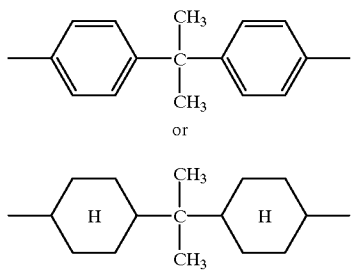

or $R_{10}$ and $R_{11}$ with the two nitrogen atoms form a piperazine ring, $R_{14}$ is straight or branched chain $C_2$–$C_8$alkylene, straight or branched chain $C_4$–$C_{10}$alkylene which is interrupted by —O—, cycloalkylene, arylene or

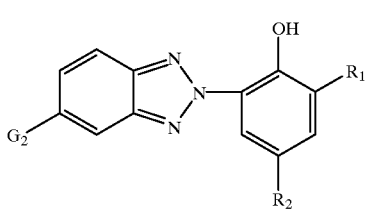

or

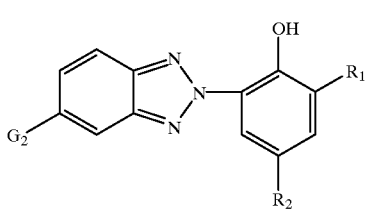

where $R_7$ and $R_8$ are independently hydrogen, alkyl of 1 to 18 carbon atoms or $R_7$ and $R_8$ together are alkylene of 4 to 6 carbon atoms, 3-oxapentamethylene, 3-iminopentamethylene or 3-methyliminopentamethylene, $R_{11}$ is hydrogen, straight or branched chain $C_1$–$C_{18}$alkyl, $C_5$–$C_{12}$cycloalkyl, straight or branched chain $C_3$–$C_8$alkenyl, $C_6$–$C_{14}$aryl or $C_7$–$C_{15}$aralkyl, $R_{12}$ is straight or branched chain $C_1$–$C_{18}$alkyl, straight or branched chain $C_3$–$C_{18}$alkenyl, $C_5$–$C_{10}$cycloalkyl, $C_6$–$C_{16}$aryl or $C_7$–$C_{15}$aralkyl, $R_{13}$ is H, straight chain or branched $C_1$–$C_{18}$alkyl which is substituted by —PO(OR$_{12}$)$_2$, phenyl which is unsubstituted or substituted by OH, $C_7$–$C_{15}$aralkyl or —CH$_2$OR$_{12}$, $R_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, L is alkylene of 1 to 12 carbon atoms, alkylidene of 2 to 12 carbon atoms, benzylidene, p-xylylene or cycloalkylidene, and T is —SO—, —SO$_2$—, —SO—E—SO—, —SO$_2$—E—SO$_2$—, —CO—, —CO—E—CO—, —COO—E—OCO—, —CO—NG$_3$—E—NG$_3$—CO— or —NG$_3$—CO—E—CO—NG$_3$—, where E is alkylene of 2 to 12 carbon atoms, cycloalkylene of 5 to 12 carbon atoms, or alkylene interrupted or terminated by cyclohexylene of 8 to 12 carbon atoms, which benzotriazole exhibits enhanced durability and low loss rate values when the coating is exposed to actinic radiation as witnessed by a loss of less than 0.22 absorbance units after exposure for 1200 hours, or less than 0.27 absorbance units after 1500 hours exposure, or less than 0.40 absorbance units after 2500 hours exposure in a Xenon-Arc Weather-Ometer.

Preferably, component (b) is a compound of formula A'

(A')

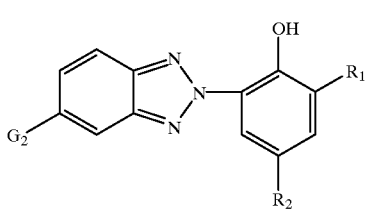

wherein
$G_2$ is fluoro, chloro, cyano, $R_3SO_2$—, $CF_3$—, —CO—$G_3$, —COO—$G_3$ or —CO—N($G_3$)$_2$,
$G_3$ is alkyl of 1 to 12 carbon atoms,
$R_1$ is hydrogen, alkyl of 1 to 12 carbon atoms, phenyl, phenylalkyl of 7 to 15 carbon atoms or said phenyl or said phenylalkyl substituted on the phenyl ring by 1 or 2 alkyl groups of 1 to 4 carbon atoms,
$R_2$ is alkyl of 1 to 12 carbon atoms, phenyl, phenylalkyl of 7 to 15 carbon atoms or —CH$_2$CH$_2$COOG$_4$ where $G_4$ is hydrogen, alkyl of 1 to 24 carbon atoms or said alkyl substituted by OH, interrupted by one to six —O—atoms or both substituted by OH and interrupted by one to six —O— atoms, and
$R_3$ is alkyl of 1 to 18 carbon atom, aryl of 6 to 10 carbon atoms or said aryl substituted one or two alkyl of 1 to 4 carbon atoms.

Most preferably, in the compound of formula A',
$G_2$ is fluoro, chloro, cyano, $R_3SO_2$—, $CF_3$—, —COO—$G_3$ or —CO—N($G_3$)$_2$,
$G_3$ is alkyl of 1 to 8 carbon atoms,
$R_1$ is hydrogen, phenyl or α-cumyl,
$R_2$ is alkyl of 4 to 12 carbon atoms or phenyl, and
$R_3$ is phenyl or alkyl of 8 to 12 carbon atoms.

Especially preferred are the compounds of formula A' where $G_2$ is phenyl—SO$_2$—, octyl—SO$_2$—, fluoro or CF$_3$—, $R_1$ is α-cumyl or phenyl, and $R_2$ is tert-butyl or tert-octyl.

Preferably, the resin is a thermoset acrylic melamine resin or an acrylic urethane resin.

Examples of these various radicals are as follow:

When any of $R_1$ to $R_{21}$ is alkyl, such groups are, for example, methyl, ethyl, isopropyl, n-butyl, isobutyl, sec-butyl, tert-butyl, tert-amyl, 2-ethylhexyl, tert-octyl, lauryl, tert-dodecyl, tridecyl, n-hexadecyl, n-octadecyl and eicosyl; when any of said radicals is alkenyl, such groups are, for example, allyl or oleyl; when any of said radicals is cycloalkyl, such groups are, for example, cyclopentyl, cyclohexyl, cycloheptyl, cyclooctyl and cyclododecyl; when any of said radicals are phenylalkyl, such groups are, for example, benzyl, phenethyl, α-methylbenzyl and α,α-dimethylbenzyl; and when any of said radicals is aryl, they are, for example, phenyl, naphthyl, or when substituted by alkyl are, for example, tolyl and xylyl. When $R_6$ is alkyl substituted by one or more —O—groups and/or substituted by one or more —OH, the —OR$_6$ moiety can be —(OCH$_2$CH$_2$)$_w$OH or —(OCH$_2$CH$_2$)$_w$OR$_{21}$ where w is 1 to 12 and $R_{21}$ is alkyl of 1 to 12 carbon atoms, for example.

When E is alkylene, it is, for example, ethylene, tetramethylene, hexamethylene, 2-methyl-1,4-tetramethylene, hexamethylene, octamethylene, decamethylene and dodecamethylene: when E is cycloalkylene, it is, for example, cyclopentylene, cyclohexylene, cycloheptylene, cyclooctylene and cyclododecylene; and when E is alkylene interrupted or terminated by cyclohexylene, it is, for example, the saturated diyl radical derived from limonene, herein called dihydrolimonenediyl.

A further preferred embodiment of the invention is a compound of formula III in which $R_1$ is tert-butyl, n is 1, $R_3$ is phenyl and $R_5$ is —$OR_6$ where $R_6$ is a straight chain or substituted octyl group. Yet another preferred embodiment of the instant invention is a compound of formula C where n is 2, $R_1$ is tert-butyl, $R_3$ is phenyl, and $R_5$ is —O—$R_9$—O— where $R_9$ is $C_2$–$C_{24}$alkylene interrupted by —O— or by —$CH_2$—CHOH—$CH_2$—O—$R_{14}$—O—$CH_2$—CHOH—$CH_2$—.

When E is alkylene, it is, for example, ethylene, tetramethylene, hexamethylene, 2-methyl-1,4-tetramethylene, hexamethylene, octamethylene, decamethylene and dodecamethylene; when E is cycloalkylene, it is, for example, cyclopentylene, cyclohexylene, cycloheptylene, cyclooctylene and cyclododecylene; and when E is alkylene interrupted or terminated by cyclohexylene, it is, for example, the saturated diyl radical derived from limonene, herein called dihydrolimonenediyl.

When the instant compounds contain a free carboxyl moiety where $R_2$ is —$CH_2CH_2COOR_6$ where $R_6$ is hydrogen, the alkali metal or amine salts of said acids are also contemplated as part of this invention allowing such UV absorbers to be used in aqueous systems due to the enhanced water solubility of such instant compounds.

$R_6$, $R_7$ and $R_8$ can be the following $C_3$–$C_{18}$alkyl radicals which are interrupted by —O—, —S—, or —$NR_{11}$— and can be substituted by OH: methoxyethyl, ethoxyethyl, butoxyethyl, butoxypropyl, methylthioethyl, $CH_3OCH_2CH_2OCH_2CH_2$—, $CH_3CH_2OCH_2CH_2OCH_2CH_2$—, $C_4H_9OCH_2CH_2OCH_2CH_2$—, ethylthiopropyl, octylthiopropyl, dodecyloxypropyl, 2-hydroxyethyl, 2-hydroxypropyl, 4-hydroxybutyl, 6-hydroxyhexyl, —$CH_2CH_2$—NH—$C_4H_9$, —$CH_2CH_2CH_2NH$—$C_8H_{17}$ and —$CH_2CH_2CH_2$—N($CH_3$)—$CH_2CH(C_2H_5)C_4H_9$, $R_6$, $R_7$, $R_8$, $R_{11}$ and $R_{12}$ can be the following $C_5$–$C_{12}$cycloalkyl radicals: cyclopentyl, cyclohexyl, cycloheptyl, cyclooctyl or cyclodecyl. In the case of $R_6$, the radical can also be substituted by —OH.

$R_7$, $R_8$ and $R_{11}$ can be the following alkenyl radicals: allyl, methallyl, 2-n-hexenyl or 4-n-octenyl.

When $R_6$ is alkenyl, it can have the same meaning as $R_7$, $R_8$ and $R_{11}$ as alkenyl radicals, but it can also be —CH=$CH_2$, n-undec-10-enyl or n-octadec-9-enyl, and it is also possible for the radical $R_6$ to be substituted by —OH.

$R_7$ and $R_8$ can be the following $C_7$–$C_{15}$aralkyl radicals: benzyl, α-phenethyl, 2-phenethyl or 4-tert-butylbenzyl.

When $R_{11}$, $R_{13}$ or $R_{12}$ are aralkyl, they can, independently of one another, have the same meaning as $R_7$ or $R_8$.

Independently of one another, $R_7$, $R_8$ and $R_{11}$ can be the following $C_6$–$C_{14}$ aryl radicals: phenyl, α-naphthyl or β-naphthyl.

When $R_7$ and $R_8$ are $C_1$–$C_3$ hydroxyalkyl, they can be the following radicals: hydroxymethyl, 2-hydroxyethyl or 2-hydroxypropyl.

As $C_2$–$C_8$ alkylene, $R_9$ and $R_{14}$ can be the following radicals: ethylene, propylene, butylene, hexylene or octylene.

As alkylene, $R_{10}$ can be the same radicals, but can, in addition, also be higher-molecular groups such as decylene or dodecylene.

When $R_9$ is a $C_4$–$C_8$alkenylene radical, the following is an example of a suitable group: butenylene.

In the case of $R_9$ and $R_{14}$, suitable straight or branched chain $C_4$–$C_{10}$alkylene groups which are interrupted by —O—are the following groups: —$CH_2CH_2OCH_2CH_2$—, —CH($CH_3$)—$CH_2$—O—$CH_2$—CH($CH_3$)—$CH_2CH_2OCH_2CH_2OCH_2CH_2$— and —$CH_2CH_2OCH_2CH_2OCH_2CH_2OCH_2CH_2$—.

When $R_{14}$ is a cycloalkylene radical, the following groups are embraced: 1,3-cyclohexylene and 1,4-cyclohexylene.

When $R_{14}$ is arylene, this can be, specifically, the following groups: 1,3-phenylene or 1,4-phenylene.

As $C_2$–$C_{12}$-alkylene, Z is a straight or branched chain. It is for example: ethylene, propylene, tetramethylene, hexamethylene, octamethylene, dodecamethylene, 1,1-ethylidene, 2,2-propylidene, 2,2-amylidene or 2-ethylhexamethylene. $C_2$–$C_6$-alkylene groups are preferred.

When Z is $C_4$–$C_{12}$-alkylene which is interrupted by oxygen, it is for example: —$CH_2$—$CH_2$—O—$CH_2$—$CH_2$—, —$CH_2$—$CH_2$—O—$CH_2$—$CH_2$—$CH_2$, $CH_2$—$CH_2$—O—$CH_2$—$CH_2$—O—$CH_2$—O—$CH_2$—$CH_2$ or —$CH_2$—$CH_2$—O—$CH_2$—$CH_2$—O—$CH_2$—$CH_2$—O—$CH_2$—$CH_2$—, and, when alkylene is interrupted by nitrogen, a group —N($R_{16}$)— is meant, where $R_{16}$ is as defined in the foregoing, for example —$CH_2$—$CH_2$—NH—$CH_2$—$CH_2$—$CH_2$—$CH_2$, —$CH_2$—$CH_2$—$CH_2$—NH—($CH_2$)$_8$— or —$CH_2CH_2$—$CH_2$—N($CH_3$—$CH_2$—CH($C_2H_5$)($CH_2$)$_4$—.

As $C_3$–$C_{12}$-alkylene substituted by a hydroxyl group, Z is 2-hydroxytetramethylene, 2-hydroxyhexamethylene and, in particular, 2-hydroxytrimethylene.

As cyclohexylene, Z is for example 1,4-cyclohexylene and, in particular, 1,2-cyclohexylene.

As phenylene, Z is for example m-phenylene or p-phenylene.

m can be zero, 1 or 2, but it is preferably 2.

p is preferably 1, but can also be zero if both X and Y are bound by way of nitrogen.

As $C_1$–$C_8$-alkyl, $R_1$ is for example: methyl, ethyl, n-propyl, isopropyl, n-butyl, sec-butyl, tert-butyl, n-pentyl, tert-amyl, n-nexyl, n-heptyl, n-octyl, 2-ethylhexyl or tert-octyl. Tert-butyl is preferred.

As $C_1$–$C_{12}$-alkyl, $R_{16}$ $R_{17}$ and $R_{20}$ can have the same meaning as that given in the foregoing for $R_1$, and can additionally be straight or branched-chain nonyl, decyl, undecyl, or dodecyl.

When $R_{16}$ and $R_{17}$ are alkyl interrupted by oxygen atoms, the examples which apply are the same as those described in the foregoing for Z.

Examples for $R_{16}$ and $R_{17}$ as aralkyl are: benzyl, α-methylbenzyl, 1-phenylethyl, α,α-dimethylbenzyl or 1-phenylpropyl.

If Z is ethylene, $R_{16}$ and $R_{17}$ together can likewise form ethylene, which is equivalent to a bridging over by way of a piperazine group.

When Y is a group —N($R_{17}$)—, $R_{15}$ and $R_{17}$ together make up a group —CO—CH=CH—CO—, and thus form the substituent

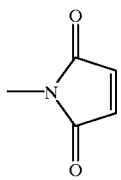

on the group —X—(Z)$_p$—.

The preferred meaning of $R_{15}$ is, however, —CO—C($R_{18}$)=$CHR_{14}$, $R_{18}$ and $R_{19}$ are preferably methyl and especially hydrogen.

$R_2$ is —$CH_2$—$CH_2$—CO—O—C(G)=$CH_2$ and G is hydrogen or methyl.

The instant invention also pertains to new benzotriazoles of formulas I, II, III or IV

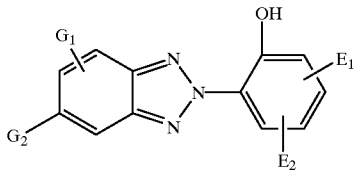

(I)

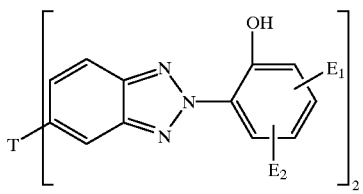

(II)

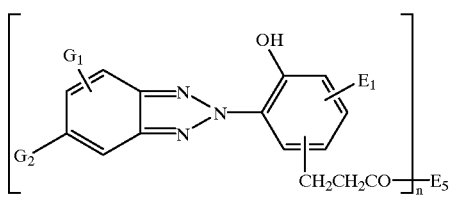

(III)

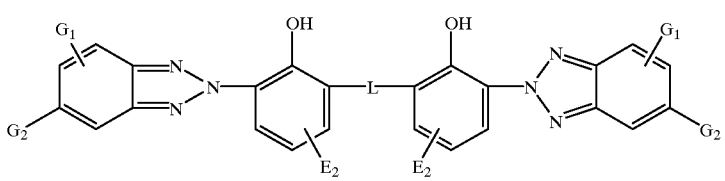

(IV)

wherein
$G_1$ is hydrogen or halogen,
$G_2$ is cyano, $E_3SO$—, $E_3SO_2$—, —$COOG_3$, $CF_3$—, —P(O)($C_6H_5$)$_2$, —CO—$G_3$, —CO—$NHG_3$ or —CO—N($G_3$)$_2$,
$G_3$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms,
$E_1$ is hydrogen, phenylalkyl of 7 to 15 carbon atoms, phenyl, or said phenyl or said phenylalkyl substituted on the phenyl ring by 1 to 4 alkyl of 1 to 4 carbon atoms,
$E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is hydroxyl or —$OE_4$ where $E_4$ is straight or branched chain alkyl of 1 to 24 carbon atoms; or said alkyl substituted by one or more —OH, —OCO—$E_{11}$, —$OE_4$, —NCO or —$NH_2$ groups or mixtures thereof; or said alkyl or said alkenyl intemipted by one or more —O—, —NH— or —$NE_4$— groups or mixtures thereof and which can be unsubstituted or substituted by one or more —OH, —$OE_4$ or —$NH_2$ groups or mixtures thereof; or $E_2$ is —$SE_3$, —NHE3 or —N($E_3$)$_2$; or $E_2$ is —(CH$_2$)$_m$—CO—X—(Z)$_p$—Y—$E_{15}$ wherein
X is —O— or —N($E_{16}$)—,
Y is —O— or —N($E_{17}$)—, Z is $C_2$–$C_{12}$-alkylene, $C_4$–$C_{12}$-alkylene interrupted by one to three nitrogen atoms, oxygen atoms or a mixture thereof, or is $C_3$–$C_{12}$-alkylene, butenylene, butynylene, cyclohexylene or phenylene, each substituted by a hydroxyl group,
m is zero, 1 or 2,
p is 1, or p is also zero when X and Y are —N($E_{16}$)— and —N($E_{17}$)—, respectively,
$E_{15}$ is a group —CO—C($E_{18}$)=C(H)$E_{19}$ or, when Y is —N($E_{17}$)—, forms together with $E_{17}$ a group —CO—CH=CH—CO—, wherein $E_{18}$ is hydrogen or methyl, and $E_{19}$ is hydrogen, methyl or —CO—X—$E_{20}$, wherein $E_{20}$ is hydrogen, $C_1$–$C_{12}$-alkyl or a group of the formula.

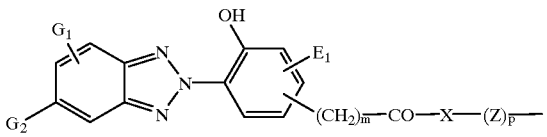

wherein the symbols $E_1$, $G_2$, X, Z, m and p have the meanings defined above, and $E_{16}$ and $E_{17}$ independently of one another are hydrogen, $C_1$–$C_{12}$-alkyl, $C_3$–$C_{12}$-alkyl interrupted by 1 to 3 oxygen atoms, or is cyclohexyl or $C_7$–$C_{15}$aralkyl, and $E_{16}$ together with $E_{17}$ in the case where Z is ethylene, also forms ethylene,
n is 1 or 2,
when n is 1, $E_5$ is Cl, $OE_6$ or $NE_7E_8$, or $E_5$ is —PO(OE$_{12}$)$_2$, —OSi(E$_{11}$)$_3$ or —OCO—E$_{11}$, or straight or branched chain C$_1$–C$_{24}$alkyl which is interrupted by —O—, —S— or —NE$_{11}$ and which can be unsubstituted or substituted by —OH or —OCO—E$_{11}$, C$_5$—C$_{12}$ cycloalkyl which is unsubstituted or substituted by —OH, straight chain or branched C$_2$–C$_{18}$alkenyl which is unsubstituted or substituted by —OH, C$_7$–C$_{15}$aralkyl, —CH$_2$—CHOH—E$_{13}$ or glycidyl, $E_6$ is hydrogen, straight or branched chain C$_1$–C$_{24}$alkyl which is unsubstituted or substituted by one or more OH, OE$_4$ or NH$_2$ groups, or —OE$_6$ is —(OCH$_2$CH$_2$)$_w$OH or —(OCH$_2$CH$_2$)$_w$OE$_{21}$ where w is 1 to 12 and E$_{21}$ is alkyl of 1 to 12 carbon atoms, $E_7$ and $E_8$ are independently hydrogen, alkyl of 1 to 18 carbon atoms, straight or branched chain C$_3$–C$_{18}$alkyl which is interrupted by —O—, —S— or —NE$_{11}$—, C$_5$–C$_{12}$cycloalkyl, C$_6$–C$_{14}$aryl or C$_1$–C$_3$hydroxylalkyl, or $E_7$ and $E_8$ together with the N atom are a pyrrolidine, piperidine, piperazine or morpholine ring, when n is 2, $E_5$ is one of divalent radicals —O—E$_9$—O— or —N(R$_{11}$)—E$_{10}$—N(E$_{11}$)—, $E_9$ is C$_2$–C$_8$alkylene, C$_4$–C$_8$alkenylene, C$_4$alkynylene, cyclohexylene, straight or branched chain C$_4$–C$_{10}$alkylene which is interrupted by —O— or by —CH$_2$—CHOH—CH$_2$—O—E$_{14}$—O—CH$_2$—CHOH—CH$_2$—, $E_{10}$ being straight or branched chain C$_2$–C$_{12}$alkylene which may be interrupted by —O—, cyclohexylene, or

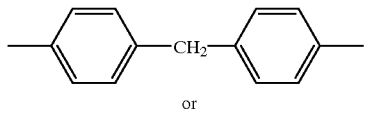

or

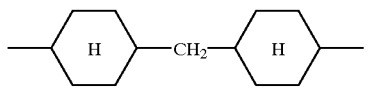

or $E_{10}$ and $E_{11}$ with the two nitrogen atoms form a piperazine ring, $E_{14}$ is straight or branched chain C$_2$–C$_8$alkylene, straight or branched chain C$_4$–C$_{10}$alkylene which is interrupted by —O—, cycloalkylene, arylene or

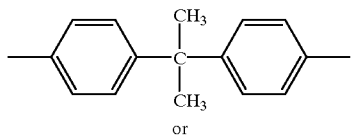

or

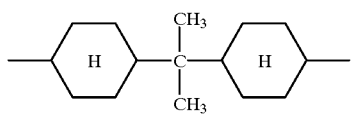

where $E_7$ and $E_8$ are independently hydrogen, alkyl of 1 to 18 carbon atoms or $E_7$ and $E_8$ together are alkylene of 4 to 6 carbon atoms, 3-oxapentamethylene, 3-iminopentamethylene or 3-methyliminopentamethylene, $E_{11}$ is hydrogen, straight or branched chain C$_1$–C$_{18}$alkyl, C$_5$–C$_{12}$cycloalkyl, straight or branched chain C$_3$–C$_8$alkenyl, C$_6$–C$_{14}$aryl or C$_7$–C$_{15}$aralkyl, $E_{12}$ is straight or branched chain C$_1$–C$_{18}$alkyl, straight or branched chain C$_3$–C$_{18}$alkenyl, C$_5$–C$_{10}$cycloalkyl, C$_6$–C$_{16}$aryl or C$_7$–C$_{15}$aralkyl, $E_{13}$ is H, straight chain or branched C$_1$–C$_{18}$alkyl which is substituted by —PO(OR$_{12}$)$_2$, phenyl which is unsubstituted or substituted by OH, C$_7$–C$_{15}$aralkyl or —CH$_2$OE$_{12}$, $E_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, L is alkylene of 1 to 12 carbon atoms, alkylidene of 2 to 12 carbon atoms, benzylidene, p-xylylene or cycloalkylidene, and T is —SO—, —SO$_2$—, —SO—E—SO—, —SO2—E—SO$_2$—, —CO—, —CO—E—CO—, —COO—E—OCO— or —CO—NG$_5$—E—NG$_5$—CO—, where E is alkylene of 2 to 12 carbon atoms, cycloalkylene of 5 to 12 carbon atoms, or alkylene interrupted or terminated by cyclohexylene of 8 to 12 carbon atoms;

$G_5$ is $G_3$ or hydrogen, and with the proviso that $E_1$ is not phenylalkyl when $G_2$ is $E_3$SO— or $E_3$SO$_2$—.

Preferably, the new benzotriazole is a compound of formula I'

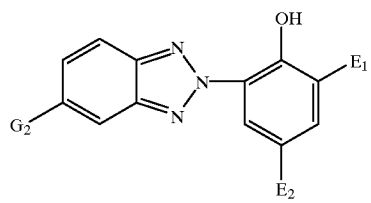

(I')

wherein $G_2$ is cyano, $E_3$SO$_2$—, CF$_3$—, —COO—G$_3$—CO—NHG$_3$ or —CO—N(G$_3$)$_2$, $G_3$ is alkyl of 1 to 12 carbon atoms, $E_1$ is hydrogen, phenyl, phenylalkyl of 7 to 15 carbon atoms or said phenyl or said phenylalkyl substituted on the phenyl ring by 1 or 2 alkyl groups of 1 to 4 carbon atoms, $E_2$ is alkyl of 1 to 12 carbon atoms, phenyl, phenylalkyl of 7 to 15 carbon atoms or —CH$_2$CH$_2$COOG$_4$ where G$_4$ is hydrogen, alkyl of 1 to 24 carbon atoms or said alkyl substituted by OH, interrupted by one to six —O—atoms or both substituted by OH and interrupted by one to six —O—atoms, $E_3$ is alkyl of 8 to 18 carbon atom, aryl of 6 to 10 carbon atoms or said aryl substituted one or two alkyl of 1 to 4 carbon atoms, and with the proviso that $E_1$ is not phenylalkyl when $G_2$ is $E_3$SO— or $E_3$SO$_2$—.

Most preferably, in the compound of formula I', $G_2$ is cyano, $E_3$SO$_2$—, CF$_3$—, —CO—G$_3$ or —CO—N(G$_3$)$_2$, $G_3$ is alkyl of 1 to 8 carbon atoms, $E_1$ is hydrogen, phenyl or α-cumyl, $E_2$ is alkyl of 4 to 12 carbon atoms, and $E_3$ is phenyl or octyl, and with the proviso that $E_1$ is not α-cumyl when $G_2$ is $E_3$SO$_2$—.

Especially preferred are the compounds of formula I' where $G_2$ is CF$_3$—, $E_1$ is α-cumyl, and $E_2$ is tert-butyl or tert-octyl.

The instant invention also pertains to a composition stabilized against thermal, oxidative or light-induced degradation which comprises, (a) an organic material subject to thermal, oxidative or light-induced degradation, and (b) an effective stabilizing amount of a compound of formula I, II, III or IV.

Preferably, the organic material is a natural, semi-synthetic or synthetic polymer, especially a thermoplastic polymer.

Most preferably, the polymer is a polyolefin or polycarbonate, especially polyethylene or polypropylene; most especially polypropylene.

In another preferred embodiment of the instant invention, the organic material is a resin selected from the group consisting of a thermoset acrylic melamine resin, an acrylic urethane resin, an epoxy carboxy resin, a silane modified acrylic melamine, an acrylic resin with carbamate pendant groups crosslinked with melamine or an acrylic polyol resin crosslinked with melamine containing carbamate groups.

Most preferably, the resin is a thermoset acrylic melamine resin or an acrylic urethane resin.

In yet another preferred embodiment of the instant invention, the organic material is a recording material.

The recording materials according to the invention are suitable for pressure-sensitive copying systems, photocopying systems using microcapsules, heat-sensitive copying systems, photographic materials and ink jet printing.

The recording materials according to the invention are distinguished by an unexpected improvement in quality, especially with regard to the fastness to light.

The recording materials according to the invention have the construction known for the particular use. They consist of a customary carrier, for example, paper or plastic film, which has been coated with one or more layers. Depending on the type of material, these layers contain the appropriate necessary components, in the case of photographic materials, for example, silver halide emulsions, dye couplers, dyes and the like. Material particularly suitable for ink jet printing has a layer particularly absorptive for ink on a customary carrier. Uncoated paper can also be employed for ink jet printing. In this case the paper acts at the same time as the carrier material and as the ink-absorbent layer. Suitable material for ink jet printing is, for example, described in U.S. Pat. No. 5,073,448 which is incorporated herein by reference.

The recording material can also be transparent as, for example, in the case of projection films.

The compounds of formula I, II, III or IV can be incorporated into the carder material as early as the production of the latter, in the production of paper, for example, being added to the paper pulp. A second method of application is to spray the carder material with an aqueous solution of compounds of formula I, II, III or IV or to add the compounds to the coating composition.

Coating compositions intended for transparent recording materials suitable for projection cannot contain any particles which scatter light, such as pigments and fillers.

The dye-binding coating composition can contain a number of other additives, for example, antioxidants, light stabilizers (including also UV absorbers which do not fall under the scope of the UV absorbers of this invention), viscosity improvers, fluorescent brighteners, biocides and/or antistatic agents.

The coating composition is usually prepared as follows: the water-soluble components, for example, the binder, are dissolved in water and stirred together; the solid components, for example, fillers and other additives already described, are dispersed in this aqueous medium; and dispersion is advantageously carried out by means of devices, for example, ultrasonic systems, turbine stirrers, homogenizers, colloid mills, bead mills, sand mills, high-speed stirrers and the like. The compounds of formula I, II, III or IV can be easily incorporated into the coating composition.

The recording material according to this invention preferably contains 1 to 5000 mg/m$^2$, in particular 50–1200 mg/m$^2$, of a compound of formula I.

As already mentioned, the recording materials according to the invention embrace a wide field. The compounds of formula I, II, III or IV can, for example, be employed in pressure-sensitive copying systems. They can be introduced either into the paper in order to protect the microencapsulated dye precursors there from light, or into the binder of the developer layer in order to protect the dyes formed there.

Photocopying systems using light-sensitive microcapsules which are developed by means of pressure are described in U.S. Pat. Nos. 4,416,966; 4,483,912; 4,352,200; 4,535,050; 4,535,463; 4,551,407; 4,562,137 and 4,608,330; and also in EP-A 139,479; EP-A 162,664; EP-A 164,931; EP-A 237,024; EP-A 237,025 and EP-A 260,129. In all these systems, the compounds can be put into the dye-receiving layer. The compounds can, however, also be put into the donor layer in order to protect the color formers from light.

Photographic materials which can be stabilized are photographic dyes and layers containing such dyes or precursors thereof, for example, photographic paper and films. Suitable materials are, for example, described in U.S. Pat. No. 5,364,749 which is incorporated herein by reference. The compounds of formula I, II, III or IV act here as a UV filter against electrostatic flashes. In color photographic materials, couplers and dyes are also protected against photochemical decomposition.

The instant compounds can be used for all types of color photographic materials. For example, they can be employed for color paper, color reversal paper, direct-positive color material, color negative film, color positive film, color reversal film and the like. They are preferably used inter alia for photographic color material which contains a reversal substrate or form positives.

Color-photographic recording materials usually contain, on a support, a blue-sensitive and/or a green-sensitive and/or a red-sensitive silver halide emulsion layer and, if desired, a protection layer, with the instant compounds being, preferably, either in the green-sensitive or the red-sensitive layer or in a layer between the green-sensitive and the red-sensitive layer or in a layer on top of the silver halide emulsion layers.

The compounds of formula I, II, III or IV can also be employed in recording materials based on the principles of photopolymerization, photoplasticization or the rupture of microcapsules, or in cases where heat-sensitive and light-sensitive diazonium salts, leuko dyes having an oxidizing agent or dye lactones having Lewis acids are used.

Furthermore, the instant compounds can be employed in recording materials for dye diffusion transfer printing, thermal wax transfer printing and non-matrix printing and for use with electrostatic, electrographic, electrophoretic, magnetographic and laser-electrophotographic printers and pen-plotters. Of the above, recording materials for dye diffusion transfer printing are preferred, for example, as described in EP-A 507,734.

The instant compounds can also be employed in inks, preferably for ink jet printing, for example, as described in U.S. Pat. No. 5,098,477 which is incorporated herein by reference.

The compounds of this invention exhibit superior hydrolytic stability, handling and storage stability as well as good resistance to extractability when present in a stabilized composition.

The methodology to make the instant compounds is described in the prior art. The intermediates needed to make the instant compounds are largely items of commerce.

Preferred compounds are those in which one of X and Y is —O—; and particularly those in which both X and Y are —O—.

In general polymers which can be stabilized include
1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:
   a) radical polymerisation (normally under high pressure and at elevated temperature).
   b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1 -ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidenenorbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer, and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutaienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, ureas and melamines on the other hand, such as phenol/formaldehyde resins, urea/formaldehyde resins and melamine/formaldehyde resins.
22. Drying and non-drying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.
24. Crosslinkable acrylic resins derived from substituted acrylates, for example epoxy acrylates, urethane acrylates or polyester acrylates.
25. Alkyd resins, polyester resins and acrylate resins crosslinked with melamine resins, urea resins, polyisocyanates or epoxy resins.
26. Crosslinked epoxy resins derived from polyepoxides, for example from bisglycidyl ethers or from cycloaliphatic diepoxides.
27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.
29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.
30. Aqueous emulsions of natural or synthetic rubber, e.g. natural latex or latices of carboxylated styrene/butadiene copolymers.
31. Polysiloxanes such as the soft, hydrophilic polysiloxanes described, for example, in U.S. Pat. No. 4,259,467; and the hard polyorganosiloxanes described, for example, in U.S. Pat. No. 4,355,147.
32. Polyketimines in combination with unsaturated acrylic polyacetoacetate resins or with unsaturated acrylic resins. The unsaturated acrylic resins include the urethane acrylates, polyether acrylates, vinyl or acryl copolymers with pendant unsaturated groups and the acrylated melamines. The polyketimines are prepared from polyamines and ketones in the presence of an acid catalyst.
33. Radiation curable compositions containing ethylenically unsaturated monomers or oligomers and a polyunsaturated aliphatic oligomer.
34. Epoxymelamine resins such as light-stable epoxy resins crosslinked by an epoxy functional coetherified high solids melamine resin such as LSE-4103 (Monsanto).

In general, the compounds of the present invention are employed in from about 0.01 to about 5% by weight of the stabilized composition, although this will vary with the particular substrate and application. An advantageous range is from about 0.05 to about 3%, and especially 0.05 to about 1%.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain from about 0.01 to about 5%, preferably from about 0.025 to about 2%, and especially from about 0.1 to about 1% by weight of various conventional additives, such as the materials listed below, or mixtures thereof.

1. Antioxidants
1.1. Alkylated monophenols, for example,
2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert-butyl-4-methoxymethylphenol
1.2. Alkylated hydroquinones, for example, 2,6-di-tert-butyl-4-methoxyphenol
2,5-di-tert-butyl-hydroquinone
2,5-di-tert-amyl-hydroquinone
2,6-diphenyl-4-octadecyloxyphenol
1.3. Hydroxylated thiodiphenyl ethers, for example,
2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)
1.4. Alkylidene-bisphenols, for example,
2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4-methylphenyl] terephthalate.
1.5. Benzyl compounds, for example,
1,3,5-tri-(3,5-di-tert-butyl-4-hydroxybenzyl)-2,4,6-trimethylbenzene
di-(3,5-di-tert-butyl-4-hydroxybenzyl) sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl) isocyanurate
1,3,5-tris-(4-tert-butyl-3-hydroxy-2,6-dimethylbenzyl) isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt
1.6. Acylaminophenols, for example,
4-hydroxy-lauric acid anilide
4-hydroxy-stearic acid anilide
2,4-bis-octylmercapto-6-(3,5-tert-butyl-4-hydroxyanilino)-s-triazine
octyl-N-(3,5-di-tert-butyl-4-hydroxyphenyl)-carbamate
1.7. Esters of β-(3,5-di-tert-butyl-4-hydroxyphenyl)-propionic acid with monohydric or polyhydric alcohols, for example,

| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.8. Esters of β-(5-tert-butyl-4-hydroxy-3-methylphenyl)-propionic acid with monohydric or polyhydric alcohols, for example,

| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.9. Amides of β-(3,5-di-tert-butyl-4-hydroxyphenyl)-propionic acid for example,
N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine
1.10 Diarylamines, for example, diphenylamine, N-phenyl-1-naphthylamine, N-(4-tert-octylphenyl)-1-naphthylamine, 4,4'-di-tert-octyl-diphenylamine, reaction product of N-phenylbenzylamine and 2,4,4-trimethylpentene, reaction product of diphenylamine and 2,4,4-trimethylpentene, reaction product of N-phenyl-1-naphthylamine and 2,4,4-trimethylpentene.
2. UV absorbers and light stabilizers
2.1. 2-(2'-Hydroxyphenyl)-benzotriazoles, for example, the 5'-methyl-, 3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-, 3',5'-bis-(α,α-dimethylbenzyl), 3'-tert-butyl-5'-(2-(omega-hydroxy-octa-(ethyleneoxy)carbonyl-ethyl)-,3'-dodecyl-5'-methyl-, and 3'-tert-butyl-5'-(2-octyloxycarbonyl)ethyl-, and dodecylated-5'-methyl derivatives.
2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivatives.
2.3. Esters of optionally substituted benzoic acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.
2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.
2.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically hindered amines, for example bis-(2,2,6,6-tetramethylpiperidyl) sebacate, bis-(1,2,2,6,6-pentamethylpiperidyl) sebacate, n-butyl-3,5-di-tert.butyl-4-hydroxybenzyl malonic acid bis-(1,2,2,6,6-pentanemethylpiperidyl)ester, condensation product of 1-hydroxyethyl-2,2,6,6-tetramethyl-4-hydroxypiperidine and succinic acid, condensation product of N,N'-(2,2,6,6-tetra-methylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1'(1,2-ethanediyl)-bis-(3,3,5,5-tetramethylpiperazinone), bis(1-octyloxy-2,2,6,6-tetramethylpiperidin-4-yl) sebacate.

2.7. Oxalic acid diamides, for example, 4,4'-di-octyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis (3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstituted oxanilides.

2.8. Hydroxyphenyl-s-triazines, for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis [2-hydroxy-4-(2hydroxyethoxy)phenyl]-6-(4-chlorophenyl)-s-triazine; 2,4-bis[2-hydroxy-4-(2-hydroxy-4-(2hydroxyethoxy)phenyl]-6-(2,4-dimethylphenyl)-s-triazine; 2,4-bis [2-hydroxy-4-(2-hydroxyethoxy)-phenyl]-6-(4-bromophenyl)-s-triazine; 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecyl-pentaerythritol diphosphite, di-(2,4,6-tri-tert-butylphenyl)-pentaerythritol diphosphite, di-(2,4-di-tert-butyl-6-methylphenyl)-pentaerythritol diphosphite, di-(2,4-di-tert-butylphenyl)pentaerythritol diphosphite, tristearyl-sorbitol triphosphite, tetrakis-(2,4-di-tert-butylphenyl) 4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecyl-hydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid.

11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, plasticizers, lubricants, emulsifiers, pigments, optical brighteners, flameproofing agents, anti-static agents, blowing agents and thiosynergists such as dilauryl thiodipropionate or distearyl thiodipropionate.

13. Benzofuranones and indolinones, for example those disclosed in U.S. Pat. No. 4,325,863, U.S. Pat. No. 4,338,244 or U.S. Pat. No. 5,175,312, or 3-[4-(2-acetoxyethoxy)phenyl]-5,7-di-tert-butyl-benzo-furan-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)-benzofuran-2-one, 3-(4-acetoxy-3,5-dimethylphenyl)-5,7-di-tert-butyl-benzofuran-2-one, 3-(3,5-di-methyl-4-pivaloyloxyphenyl)-5,7-di-tert-butyl-benzofuran-2-one.

The co-stabilizers, with the exception of the benzofuranones listed under 11, are added for example in concentrations of 0.01 to 10%, relative to the total weight of the material to be stabilzed.

Further preferred compositions comprise, in addition to components (a) and (b) further additives, in particular phenolic antioxidants, light stabilizers or processing stabilizers.

Particularly preferred additives are phenolic antioxidants (item 1 of the list), sterically hindered amines (item 2.6 of the list), phosphites and phosphonites (item 4 of the list) and peroxide-destroying compounds (item 5.) of the list.

Additional additives (stabilizers) which are also particularly preferred are benzofuran-2-ones, such as described, for example, in U.S. Pat. No. 4,325,863, U.S. Pat. No. 4,338,244 or U.S. Pat. No. 5,175,312.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinammate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxy-benzyl) benzene, 3,6-dioxaoctamethylene bis(3-methyl-5-tert-butyl- 4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocynurate, 1,1,3,-tris(2-methyl-4-hydroxy-5-tert-butylphenyl)butane, 1,3,5-tris[2-(3,5-di-tert-butyl-4-hydroxyhydrocinnamoyloxy) ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis[2-(3,5-di-tert-butyl-4-hydroxyhydrocinnamoyloxy)-ethyl]-oxamide.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-tri-methyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol or 2,2'-ethylidene-bis(4,6-di-tert-butylphenol).

The hindered amine compound of particular interest is selected from the group consisting of bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, 4-benzoyl-2,2,6,6-tetramethylpiperidine, 4-stearyloxy-2,2,6,6-tetramethylpiperidine, 3-n-octyl-7,7,9,9-tetramethyl-1,3,8-triaza-spiro[4.5]decane-2,4-dione, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2] heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidine) and 1,2-dibromoethane, tetrakis(2,2,6,6-tetramethylpiperidin-4-yl) 1,2,3,4-butanetetracarboxylate, tetrakis(1,2,2,6,6-pentamethylpiperidin-4-yl) 1,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N'',N'''-tetrakis[(4,6-bis(butyl-1,2,2,6,6-pentamethyl-piperidin-4-yl)-amino-s-triazin-2-yl]-1,10-diamino-4,7-diazadecane, mixed [2,2,6,6-tetramethylpiperidin-4-yl/β,β,β',β'-tetramethyl-3,9-(2,4,8,10-tetraoxaspiro[5.5]-undecane) diethyl]1,2,3,4-butanetetracarboxylate, mixed [1,2,2,6,6-pentamethylpiperidin-4yl/β,β,β',β'-tetramethyl-3,9-(2,4,8,10-tetraoxaspiro[5.5]-undecane)diethyl]1,2,3,4-butanetetracarboxylate, octamethylene bis(2,2,6,6-tetramethyl-peperidin-4-carboxylate), 4,4'-ethylenebis(2,2,6,6-tetramethylpiperazin-3-one), N-2,2,6,6-tetramethyl-piperidin-4-yl-n-dodecylsuccinimide, N-1,2,2,6,6-pentamethyl-piperidin-4-yl-n-dodecylsuccinimide, N-1-acetyl-2,2,6,6-tetramethylpiperidin-4-yln-dodecylsuccinimide, 1-acetyl3-dodecyl-7,7,9,9-tetramethyl-1,3,8-triazaspiro[4.5]decane-2,4-dione, di-(1-octyloxy-2,2,6,6-tetramethylpiperidin-4-yl) sebacate, di-(1-cyclohexyloxy-2,2,6,6-tetra-methylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], and 2,4,6-tris[N-(1-cyclohexyloxy-2,2,6,6-tetramethylpiperidin-4-yl)-n-butylamino]-s-triazine.

A most preferred hindered amine compound is bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine), N,N',N'',N'''-tetrakis[(4,6-bis(butyl-(1,2,2,6,6-pentamethylpiperidin-4-yl)amino)-s-triazine-2-yl]-1,10-diamino-4,7-diazadecane di-(1-octyloxy-2,2,6,6-tetramethylpiperidin-4-yl) sebacate, di-(1-cyclohexyloxy-2,2,6,6-tetramethylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], or 2,4,6-tris[N-(1-cyclohexyloxy-2,2,6,6-tetramethylpiperidin-4-yl)-n-butylamino]-s-triazine.

The instant composition can additionally contain another UV absorber selected from the group consisting of the s-triazines, the oxanilides, the hydroxybenzophenones, benzoates and the α-cyanoacrylates.

Particularly, the instant composition may additionally contain an effective stabilizing amount of at least one other 2-hydroxyphenyl-2H-benzotriazole; another tris-aryl-s-triazine; or hindered amine or mixtures thereof.

Preferably, the 2-hydroxyphenyl-2H-benzotriazole is selected from the group consisting of 2-(2-hydroxy-3,5-di-tert-amylphenyl)-2H-benzotriazole;

2-[2-hydroxy-3,5-di(α,α-dimethylbenzyl)phenyl]-2H-benzotriazole;

2-[2-hydroxy-3-(α,α-dimethylbenzyl)-5-octylphenyl]-2H-benzotriazole;

2-{2-hydroxy-3-tert-butyl-5-[2-(omega-hydroxy-octa (ethyleneoxy)carbonyl)ethyl]-phenyl}-2H-benzotriazole; and 2-{2-hydroxy-3-tert-butyl-5-[2-(octyloxy)carbonyl)ethyl] phenyl}-2H-benzo-triazole.

Preferably, the other tris-aryl-s-triazine is selected from the group consisting of 2,4-bis (2,4-dimethylphenyl)-6-(2- hydroxy-4-octyloxyphenyl)-s-triazine;

2,4-diphenyl-6-(2-hydroxy-4-hexyloxyphenyl)-s-triazine;

2,4-bis(2,4-dimethylphenyl)-6-[2-hydroxy-4-(3-do-/tri-decyloxy-2-hydroxypropoxy)-phenyl]-s-tiazine; and 2-(2-hydroxyethylamino)-4,6-bis[N-butyl-N-(1-cyclohexyloxy-2,2,6,6-tetramethyl-piperidin-4-yl) amino]-s-triazine.

The alkyd resin lacquers which can be stabilized against the action of light and moisture in accordance with the instant invention are the conventional stoving lacquers which are used in particular for coating automobiles (automobile finishing lacquers), for example lacquers based on alkyd/melamine resins and alkyd/acrylic/melamine resins (see H. Wagner and H. F. Sarx, "Lackkunstharze" (1977), pages 99–123). Other crosslinking agents include glycouril resins, blocked isocyanates or epoxy resins.

The lacquers stabilized in accordance with the invention are suitable both for metal finish coatings and solid shade finishes, especially in the case of retouching finishes, as well as various coil coating applications. The lacquers stabilized in accordance with the invention are preferably applied in the conventional manner by two methods, either by the single-coat method or by the two-coat method. In the latter method, the pigment-containing base coat is applied first and then a covering coat of clear lacquer over it.

It is also to be noted that the compounds of the present invention are applicable for use in non-acid catalyzed thermoset resins such as epoxy, epoxy-polyester, vinyl, alkyd, acrylic and polyester resins, optionally modified with silicon, isocyanates or iso-cyanurates. The epoxy and epoxypolyester resins are crosslinked with conventional crosslinkers such as acids, acid anhydrides, amines and the like. Correspondingly, the epoxide may be utilized as the crosslinking agent for various acrylic or polyester resin systems that have been modified by the presence of reactive groups on the backbone structure.

When used in two-coat finishes, the compounds of the instant invention can be incorporated in the clear coat or both in the clear coat and in the pigmented base coat.

When water-soluble, water miscible or water dispersible coating are desired ammonium salts of acid groups present in the resin are formed. Powder coating composition can be prepared by reacting glycidyl methacrylate with selected alcohol components.

The instant benzotriazoles are made by conventional methods for preparing such compounds. The usual procedure involves the diazotization of a substituted o-nitroaniline followed by coupling the resultant diazonium salt with a substituted phenol and reduction of the azobenzene intermediate to the corresponding desired benzotriazole. The starting materials for these benzotriazoles are largely items of commerce or can be prepared by normal methods of organic synthesis.

While the instant benzotriazoles with their enhanced durability are particularly suited for automotive coating applications, it is contemplated that they will also be espeically useful in other applications where their enhanced durability is required such as in solar films and the like.

The following examples are for illustrative purposes only and are not to be construed to limit the scope of the instant invention in any manner whatsoever.

EXAMPLE 1

5-Trifluoromethyl-2-(2-hydroxy-3-α-cumyl-5-tert-octylphenyl)-2H-benzotriazole a. Diazotization of 4-amino-3-nitro-benzotrifluoride To a 500 ml 3-necked flask, equipped with a mechanical stirrer, are added 41.2 g of 4-amino-3-nitro-benzotrifluoride, 52 ml of concentrated hydrochloride acid and 100 ml of distilled water. The stirred solution is cooled to 5° C. and 17.3 g of sodium nitrite dissolved in 50 ml of water are added. The solution is stirred at 0 to 5° C. for two hours, then filtered and stored at −10° C.

b. Monoazo Adduct

To a 1000 ml flask, fitted with a mechanical stirrer, are added 40 g of sodium hydroxide dissolved in 200 ml of methanol and 32.4 g of 2-α-cumyl-4-tert-octylphenol in 50 ml of xylene. The solution is cooled to 5° C. and the diazo solution of 4-amino-nitro-benzotrifluoride prepared in part a. is added at 0 to 5° C. over a two-hour period. The 100 ml of xylene are added and the organic layer is washed with water, awueous hydrochloride acid, water, aqueous sodium bicarbonate solution and finally water. The solvent is removed under reduced pressure and the residue is purified by chromatography (silica gel, heptane:ethyl acetate 95:5) to yield 42.1 g of the adduct product as a dark red paste.

c. Reduction of the Monoazo Adduct

A 1000 ml flask is charged with 20 g of sodium hydroxide, 40 ml of water, 42.1 g of the monoazo adduct prepared in part b. and 400 ml of ethanol. The mixture is warmed to 80° C. and 27 g of formamidine sulfinic acid is added in portions with stirring. After 1.5 hours, the solution is cooled to room temperature and 100 ml of water are added. The pH is adjusted to pH 7 with concentrated hydrochloric acid. The ethanol is removed under vacuum and the water layer is extracted with methylene chloride. The solvent is then evaporated in vacuo and the residue is purified by chromatography (silica gel, heptane:tolunen 9:1) and crystallized from ethanol. The title compound is obtained in a yield of 5.6 g as a pale yellow solid melting at 119–121° C.

EXAMPLE 2

5-Fluoro-2-(2-hydroxy-3-α-cumyl-5-tert-octylphenyl)-2H-benzotriazole

The title compound is prepared according to the general procedure of Example 1 using 31.2 g of 4-fluoro-2-nitroaniline. In part c of the procedure, an additional 9 g of formamidine sulfinic acid is required to complete the reduction. Purification of the crude product on silica gel (heptane:toluene, 1:1) yields 4.5 g of the title compound as a off-white solid. Further purification by recrystallization from acetonitrile:toluene provides 1.1 g of the title compound melting at 93–96° C.

EXAMPLE 3

5-Chloro-2-(2-hydroxy-3-α-cumyl-5-tert-octylphenyl)-2H-benzotriazole

The general procedure of Example 1 parts a and b is followed to prepare the monoazo intermediate of making the title compound from 339.3 g of 4-chloro-2-nitroaniline. The crude product is purified by recrystallization from methanol to yield 70.9 g of deep red monoazo adduct.

Reduction of the Monoazo Adduct

A mixture of 11.8 g of sodium hydroxide and 138 g of 2-butanol is heated to 95° C. A solution of 60.1 g of the above monoazo adduct and 1.3 g of 2,3-dichloro- 1,4-naphthoquinone in 90 g of 2-butanol is added over a 90 minute period with stirring. The reaction mixture is heated to remove the 2-butanone byproduct with additional 2-butanol added to replace the distillate. The reaction mixture is cooled to 85° C., washed with 2.5 N sulfuric acid and brine and then concentrated. The residue is recrystallized from methanol:xylene to yield 45.6 g of the title compound as a light yellow solid melting at 104–105° C.

EXAMPLE 4

5-Phenylthio-2-(2-hydroxy-3-α-cumyl-5-tert-octylphenyl)-2H-benzotriazole

To a stirred mixture of 75 g of 5-chloro-2-(2-hydroxy-3-α-cumyl-5-tert-octylphenyl)-2H-benzotriazole and 105 g of N-methylpyrrolidone heated at 90° C. is added first 44.3 g of 45% aqueous potassium hydroxide solution over a 15-minute period then 20.4 g of thiophenol over another 15 minutes. The reaction mixture is then heated at 170–175° C. for four hours with water being removed by distillation.

After cooling to 100° C., xylene and water are added and the resultant mixture is made acidic with 15% aqueous hydrogen chloride solution. The organic layer is separated and washed with water and then concentrated. The crude product residue is recrystallized from methanol to yield 82 g of the title compound as a pale yellow solid melting at 124–125° C.

EXAMPLE 5

5-Benzenesulfonyl-2-(2-hydroxy-3-α-cumyl-5-tert-octylphenyl)-2H-benzotriazole

A 1000 mL flask is charged with 75.2 g of 5-phenylthio-2-(2-hydroxy-3-α-cumyl-5-tert-octylphenyl)-2H-benzotriazole, prepared in Example 4, 102 g of xylene, 0.9 g of sodium tungstate dihydrate and 18.4 g of formic acid. The mixture is heated to 50° C. To this stirred mixture is slowly added 36.3 g of 50% hydrogen peroxide so that the temperature does not exceed 85° C. Additional xylene and water are then added. The organic layer is separated, washed with aqueous sodium sulfite, then twice with water and concentrated. The crude product residue is recrystallized from methanol to yield 75.2 g of the title compound as a light yellow solid melting at 170–171° C.

EXAMPLE 6

5-Nonylthio-2-(2-hydroxy-3-α-cumyl-5-tert-octylphenyl)-2H-benzotriazole

Using the procedure of Example 4 with 30 g of 5-chloro-2-(2-hydroxy-3-α-cumyl-5-tert-octylphenyl)-2H-benzotriazole and 17.6 g of nonyl mercaptan, the title compound is prepared.

EXAMPLE 7

5-Nonylsulfonyl-2-(2-hydroxy-3-α-cumyl-5-tert-octylphenyl)-2H-benzotriazole

5-Nonylthio-2-(2-hydroxy-3-α-cumyl-5-tert-octylphenyl)-2H-benzotriazole, prepared in Example 6, is oxidized to the sulfone without purification of the thio intermediate using 8.7 g of formic acid, 0.7 g of sodium tungstate dihydrate and 17.6 g of 50% hydrogen peroxide to yield the title compound as a yellow resin exhibiting a molecular ion of m/e 631.

EXAMPLE 8

5-Chloro-2-(2-hydroxy-3-phenyl-5-tert-octylphenyl)-2H-benzotriazole

The general procedure of Example 1 parts a and b are used to prepare the monoazo intermediate for the title compound from 4-chloro-2-nitroaniline and 2-phenyl-4-tert-octylphenol. The crude product is purified by recrystallization from methanol to yield a deep red monoazo adduct.

The title compound is prepared according to the reduction procedure of Example 3 from 65 g of the monoazo adduct prepared above, 19.9 g of sodium hydroxide and 2.4 g of 2,3-dichloro-1,4-naphthoquinone. The crude product is purified by chromatography on silica gel (hexane:ethyl acetate, 5:1) yielding a fraction which is predominantly the title compound exhibiting a molecular ion of m/e 433.

EXAMPLE 9

5-Phenylthio-2-(2-hydroxy-3-phenyl-5-tert-octylphenyl)-2H-benzotriazole

The title compound is prepared according to the procedure of Example 4 from 20 g of the compound of Example 8, 20.4 g of 45% aqueous potassium hydroxide, 10.3 g of thiophenol and 100 g of N-methylpyrrolidone. The title compound is an oil purified by chromatography on silica gel using toluene as eluent.

EXAMPLE 10

5-Benzenesulfonyl-2-(2-hydroxy-3-phenyl-5-tert-octylphenyl)-2H-benzotriazole

The title compound is prepared according to the procedure of Example 5 from 20 g of the thio compound of Example 9, 6.4 g of formic acid, 15.0 g of 50% hydrogen peroxide and 0.6 g of sodium tungstate dihydrate. Recrystallization of 2.5 g of crude material from xylene/methanol yields 2.0 g of the purified title compound as a light yellow powder melting at 204–206° C.

EXAMPLE 11

Mixture of 5-Chloro-2-(2-hycroxy-3,5-dialkylphenyl)-2H-benzotriazole (alkyl being independently $C_4$, $C_8$, $C_{12}$ and $C_{16}$)

A mixture of 65.4 g of 5-chloro-2-(2-hydroxy-3,5-dialkylphenyl)-2H-benzotriazole, 45 mL of dodecene and 13 mL of methane sulfonic acid is heated to 170° C. under nitrogen. An additional 135 mL of dodecene is added over a 4.5 hour period. The reaction mixture is allowed to cool to 100° C. and then quenched with 400 g of crushed ice and extracted thrice with ethyl acetate. The organic layers are combined, washed with water, aqueous sodium bicarbonate, water again and brine, dried over anhydrous magnesium sulfate and finally concentrated. The polymeric residue is removed by bulb to bulb distillation under vacuum at 0.2 mm and up to 210° C. Unreacted starting material is then removed by distillation (at 0.01 mm, 160° C.) to give 45 g of the title mixture as a yellow oil.

EXAMPLE 12

Mixture of 5-Phenylthio-2-(2-hydroxy-3,5-dialkylphenyl)-2H-benzotriazole (alkyl being independently $C_4$, $C_8$, $C_{12}$ and $C_{16}$)

The title mixture is prepared according to the procedure of Example 4 using 40 g the mixture of Example 11, 11.2 g of potassium hydroxide and 12.3 mL of thiophenol.

EXAMPLE 13

Mixture of 5-Benzenesulfonyl-2-(2-hydroxy-3,5-dialkylphenyl)-2H-benzotriazole (alkyl being independently $C_4$, $C_8$, $C_{12}$ and $C_{16}$)

A mixture of the crude product of Example 12, 350 mL of isopropanol, 14.7 mL of formic acid and 1.8 mL of concentrated sulfuric acid are heated to reflux and 30 mL of 50% hydrogen peroxide is added dropwise over a two-hour period. After an additional three hours at reflux, the reaction mixture is cooled and 10% aqueous sodium sulfite and aqueous sodium bicarbonate are added. The isopropanol is evaporated and the residue is extracted with methylene chloride. The organic layer is washed with water and then dried over anhydrous magnesium sulfate. The solution is concentrated to leave 45 g of crude product as a viscous prange oil. Some 30 g of this crude product is purified by chromatography on silica gel (heptane:ethyl acetate, 4:1) to yield 28.9 g of the title mixture as a yellow oil.

EXAMPLE 14

5-Diphenylphosphinyl-2-(2-hydroxy-3,5-tert-butylphenyl)-2H-benzotriazole

To a flame-dried 500 mL three-necked round-bottomed flask equipped with a condenser, magnetic stirrer and thermometer are charged 100 mL of dimethyl sulfoxide, 7.41 g (0.066 mol) of potassium tert-butoxide and 11.17 g (0.060 mol) of diphenylphosphine via a syringe. A slurry of 10.56 g (0.030 mol) of 5-chloro-2-(2-hydroxy-3,5-di-tert-butylphenyl)-2H-benzotriazole in 50 mL of dimethyl sulfoxide is added all at once to the red mixture. The resultant brown solution is stirred at 135° C. for 3.5 hours and then cooled to room temperature. The mixture is quenched with a portion of saturated ammonium chloride solution and ethyl acetate is then added. The organic layer is separated and washed thrice with water, once with brine and then dried over anhydrous magnesium sulfate. To the solution is added 50% hydrogen peroxide resulting in an exotherm. The mixture is allowed to sit for 30 minutes, then washed once with 10% sodium metabisulfite solution thrice with saturated sodium bicarbonate solution once with brine and finally dried over anhydrous magnesium sulfate. The mixture is filtered with a plug of silica gel and the solvent is removed under reduced pressure to yield 8.0 g of a crude yellow solid. The crude product is treated with medium pressure chromatography using heptane:ethyl acetate, 1:1 to afford 4.2 g (27% yield) of the title compound as a yellow solid melting at 98–100° C.

EXAMPLE 15

5-Diphenylphosphinyl-2-(2-hydroxy-3-α-cumyl-5-tert-octylphenyl)-2H-benzotriazole Following the procedure of Example 14, the title compound is prepared when 5-chloro-2-(2-hydroxy-3-α-cumyl-5-tert-octylphenyl)-2H-benzotriazole is used as the starting benzotriazole intermediate.

EXAMPLES 16–26

Following the general procedure of Example 1, the following additional 2H-benzotriazoles of formula I' are prepared.

| Example | $G_2$ | $E_1$ | $E_2$ |
| --- | --- | --- | --- |
| 16 | $CF_3$ | phenyl | tert-octyl |
| 17 | $CF_3$ | α-cumyl | tert-butyl |
| 18 | CN | α-cumyl | tert-octyl |
| 19 | CN | α-cumyl | nonyl |
| 20 | CN | α-cumyl | tert-butyl |
| 21 | $COOCH_3$ | α-cumyl | dodecyl |
| 22 | F | phenyl | tert-octyl |
| 23 | $CF_3$ | α-cumyl | nonyl |
| 24 | $CF_3$ | α-cumyl | dodecyl |
| 25 | $CON(Bu)_2$ | α-cumyl | tert-octyl |
| 26 | $COOCH_3$ | phenyl | tert-octyl |

EXAMPLE 27

5-Octylthio-2-(2-hydroxy-3-α-cumyl-5-tert-octylphenyl)-2H-benzotriazole

Using the procedure of Example 6 with 5-chloro-2-(2-hydroxy-3-α-cumyl-5-tert-octylphenyl)-2H-benzotriazole and octyl mercaptan, the title compound is prepared.

EXAMPLE 28

5-Octylsulfonyl-2-(2-hydroxy-3-α-cumyl-5-tert-octylphenyl)-2H-benzotriazole

5-Octylthio-2-(2-hydroxy-3-α-cumyl-5-tert-octylphenyl)-2H-benzotriazole, prepared in Example 27, is oxidized to the sulfone without purification of the thio intermediate using the general method of Example 7.

EXAMPLE 29

5-Chloro-2-(2,4-dihydroxyphenyl)-2H-benzotriazole

Following the general procedure of Example 1, parts a & b, the monoazo intermediate of the title compound is prepared from 17.3 g of 4-chloro-2-nitroaniline to yield 34.7 g of a deep red monoazo adduct wetcake.

Reduction of the Monoazo Adduct

A mixture of 20 g of sodium hydroxide, 500 mL of water and 26.3 of the monoazo adduct wetcake prepared above is heated to 30° C. Zinc powder (33.0 g) is added incrementally over two hours. At the end of this addition, 180 g of 40% aqueous sodium hydroxide solution is added dropwise over one hour. The mixture is stirred at ambient temperature for 96 hours. The zinc residue is removed by filtration. The aqueous solution is neutralized to pH 5–6 and the resulting slurry is filtered. The resulting filter case is washed well with water and dried to yield 22.5 g of crude product. The crude product is purified by Soxhlet extraction with acetone to give 9.6 g of the title compound.

EXAMPLE 30

5-Chloro-2-(2-hydroxy-4-octyloxyphenyl)-2H-benzotriazole

A mixture of 6.5 g of 5-chloro-2-(2,4-dihydroxyphenyl)-2H-benzotriazole, 7.1 g of 1-bromooctane, 5.2 g of anhydrous potassium carbonate and 100 mL of acetone is refluxed for 24 hours. To the resulting mixture, about 100 mL of water and ethyl acetate are added, and petroleum eg of crude product is isolated. Column chromatography using petroleum ether yields 0.9 g of the title compound whose structure is confirmed by Hnmr and mass spectrometry.

EXAMPLE 31

5-Trifluoromethyl-2-(2,4-dihydroxyphenyl)-2H-benzotriazole

Following the general procedure of Example 29, the title compound is prepared from 10.3 g of 4-amino-3-nitrobenzotrifluoride to give 6.4 g of the title compound whose structure is confirmed by Hnmr.

EXAMPLE 32

5-Trifluoromethyl-2-(2-hydroxy-4-octyloxyphenyl)-2H-benzotriazole

The title compound is prepared following the general procedure of Example 30 from 5.6 g of 5-trifluoromethyl-2-(2,4-dihydroxyphenyl)-2H-benzotriazole. The crude product is purified by column chromatography to yield 1.1 g of the title compound as a white solid melting at 79–81° C. The structure is confirmed by Hnmr and mass spectrometry.

EXAMPLE 33

5-Trifluoromethyl-2-[2-hydroxy-4-(3-butoxy-2-hydroxypropoxy)phenyl]-2H-benzotriazole A mixture of 2.3 g of 5-trifluoromethyl-2-(2,4-dihydroxyphenyl)-2H-benzotriazole prepared in Example 31, 1.3 mL of butyl glycidyl ether and 100 mg of ethyl triphenylphosphonium bromide in 50 mL of xylene is heated to reflux under nitrogen for 14 hours. Water (25 mL) and 25 mL of ethyl acetate are added and 3 g of the crude product is isolated. Recrystallization from heptane give 2.1 g of the title compound whose structure is confirmed by nmr.

EXAMPLE 34

5-Trifluoromethyl-2-(2-hydroxy-4-aminophenyl)-2H-benzotriazole

The title compound is prepared following the general procedures of Example 1 and Example 29 starting with 4-amino-3-nitrobenzotrifluoride and 3-aminophenol. The structure of the product is confirmed by nmr.

EXAMPLE 35

5-Trifluoromethyl-2-[2-hydroxy-4-(2-ethylhexanoylamino)phenyl]-2H-benzotriazole

To a mixture of 4 g of 5-trifluoromethyl-2-(2-hydroxy-4-aminophenyl)-2H-benzotriazole and 1.4 g of triethylamine in 75 mL of toluene is added dropwise a mixture of 2-ethylhexanoyl chloride in 125 mL of toluene. The resulting mixture is treated with 100 mL of water and the crude product formed is purified by column chromatography to give 1.9 g of the title compound melting at 179–181° C. The structure is confirmed by nmr.

EXAMPLE 36

5-Carbomethoxy-2-(2-hydroxy-3-α-cumyl-5-tert-octylphenyl)-2H-benzotriazole a. Esterification of 4-amino-3-nitrobenzoic Acid To a 2 L 3-necked flask fitted with a mechanical stirrer are added 700 mL of methanol, 20 g of xylene, 14 g concentrated sulfuric acid and 100 g of 4-amino-3-nitrobenzoic acid. The solution is heated to reflux for 33 hours. The mixture is cooled to 35° C. and neutralized to pH 7.8. Water (1 L) is added, the solid collected and washed with 500 ml to give after drying overnight 100.9 g of methyl 4-amino-3-nitrobenzoate.

b. Diazotization of methyl 4-amino-3-nitrobenzoate

To a 1 L 3-necked flask fitted with a mechanical stirrer is added 177 g of 96% sulfuric acid and then slowly over 90 minutes 11 g of sodium nitrite. The mixture is warmed to 30° C. to initiate the reaction. The temperature is kept below 70° C. The mixture is then cooled to 15° C. and 30 g of methyl 4-amino-3-nitrobenzoate is added over two hours keeping the temperature between 15–20° C. The mixture is cooled to 0° C. and 200 g of ice is added to make the solution suitable for the coupling reaction to form a monoazo compound.

c. Monoazo Adduct

To a 2 L 3-necked flask fitted with a mechanical stirrer and addition funnel are added 52 g of 2-α-cumyl-4-tert-octylphenol, 20 g of water, 315 g of methanol, 7 g of xylene and 150 g of sodium hydroxide. The mixture is cooled to –5° C. and the diazonium salt solution prepared is step b. is added over a two hour period with cooling to keep the temperature below 3° C. After the diazonium salt solution is added, the pH is adjusted to 6.5–7.0. The mixture is poured into 500 mL of xylene and washed thrice with 500 mL of water at 60° C. The xylene is removed by distillation to give 186 g of the monoazo adduct containing residual xylene.

d. Reduction of the Monoazo Adduct

To a 500 mL flask fitted with a mechanical stirrer is added the 186 g of monoadduct prepared in step c., 125 g of 2-butanol and 1.7 g of 2,3-dichloro-1,4-naphthoquinone. The mixture is heated to 90° C. and the resulting solution is then charged to the addition funnel on a separate flask. In said second flask are added 175 g of 2-butanol and 18.6 g of sodium hydroxide, The flask is heated to 95° C. and the monoazo solution is added over two hours while distilling off methyl ethyl ketone and 2-butanol. 2-Butanol (100 g) is added and an azeotrope is distilled off. The mixture is then cooled and 300 g of xylene and 200 mL of water are added. The pH is adjusted to 7–7.5 with 20% sulfuric acid. At 60° C., the aqueous phase is separated and the organic phase washed twice with 200 mL of water. The xylene is removed by distillation and the residue formed is crystallized from methanol to give 8.8 g of the title compound melting at 141–143° C.

EXAMPLE 37

5-[N,N-Di-n-butylcarbamoyl-2-(2-hydroxy-3-α-cumyl-5-tert-octyl)phenyl]-2H-benzotriazole a. Saponification of 5-Carbomethoxy-2-(2-hydroxy-3-α-cumyl-5-tert-octylphenyl)-2H-benzotriazole To a 250 mL 3-necked flask equipped with a mechanical stirrer, thermometer, condenser and nitrogen inlet is added 1.8 g of potassium hydroxide and 40 mL of methanol. The mixture is warmed to 40° C. to dissolve the potassium hydroxide. To this solution is added 2.7 g of 5-carbomethoxy-2-(2-hydroxy-3-α-cumyl-5-tert-octylphenyl)- 2H-benzotriazole, prepared in Example 36, in 40 mL of methanol. The reaction mixture is refluxed for six hours. The mixture is then cooled and acidified with hydrochloric acid. Ether and ethyl acetate are added, and the organic layer is separated and dried over anhydrous sodium sulfate. After vacuum stripping of the solvent, 2.5 g of 5-carboxy-2-(2-hydroxy-3-α-cumyl-5-tert-octylphenyl)-2H-benzotriazole is isolated.

b. 5-Chlorocarbonyl-2-(2-hydroxy-3-α-cumyl-5-tert-octylphenyl)-2H-benzotriazole

The 2.5 g of 5-carboxy-2-(2-hydroxy-3-α-cumyl-5-tert-octylphenyl)-2H-benzotriazole, prepared in step a., are placed in a 250 mL flask equipped with a stirrer, thermometer, reflux condenser, Dean-Stark trap and nitrogen inlet. Toluene (100 mL) is added and the mixture is reflux to remove any traces of water. The mixture is then cooled and 0.76 g of oxalyl chloride in 15 mL of toluene is added. The reaction mixture is heated slowly to 60° C. and held at 60–65° C. for eight hours till all the hydrogen chloride is expelled to give the acid chloride title compound.

c. 5-[N,N-Di-n-butylcarbamoyl-2-(2-hydroxy-3-α-cumyl-5-tert-octyl)phenyl]-2H-benzotriazole To a 500 mL flask equipped with a mechanical stirrer, drying tube, thermometer and dropping funnel are added 0.8 g of di-n-butylamine, 6 mL of pyridine and 25 mL of toluene. The mixture is cooled to 0° C. and the acid chloride solution prepared in step b. is placed in the dropping funnel and added to the reaction mixture over a 30-minute period at –5° C. to –10° C. The reaction mixture is stirred at that temperature for 1.5 hours and then held at ambient temperature overnight. The mixture was filtered and then vacuum stripped to give 3.0 g of crude solids. The solid product is chromatographed to provide 1.2 g of the title compound as a tan solid melting at 131–133° C. The structure is confirmed by nmr and mass spectrometry m/z 596.

EXAMPLE 38

5-Trifluoromethyl-2-(2-hydroxy-5-tert-octylphenyl)-2H-benzotriazole

The title compound is prepared according to general procedure of Example 1 the diazo compound of 4-amino-3-nitrobenzotrifluoride and 4-tert-octylphenol, and which is purified by chromatography on silica gel. Recrystallization of the product from either heptane or methanol yields the title compound as a near white solid melting at 80–81° C.

EXAMPLE 39

To ascertain the effect on thermal durability and loss rate from a high solids thermoset acrylic coating of various 2H-benzotriazole UV absorbers substituted by a variety of electron withdrawing and electron donating groups, the following tests are carried out.

A high solids thermoset acrylic clear coat is prepared by mixing an experimental acrylic polyol resin and hexamethoxymethylmelamine (Resimene® 747, Monsanto) at a solids ratio of 60/40. The dodecylbenzene sulfonic acid catalyst (Nacure® 5225; King Industries) is added at 0.70% by weight. A flow aid Modaflow® (Monsanto) is added at 0.25% by weight to form a model acrylic melamine resin system.

The model clear coat is reduced with xylene to a viscosity of 26–27 second using a Zahn #2 cup and applied via a conventional air spray at 50 psi (3.5 Kg/cm$^2$) over a 1"×3" (2.54 cm×7.62 cm) quartz slide. Cure is achieved by baking the slide for 30 minutes at 260° F. (127° C.). The clear coat is stabilized with 1% by weight of a hindered amine light stabilizer, bis-(1-octyloxy-2,2,6,6-tetramethylpiperidin-4-yl) sebacate, (TINUVIN® 123, Ciba-Geigy). The various test benzotriazole UV absorbers are incorporated at the 5 mmol % by weight in the clear coat. The film thickness on the quartz slides range from 1.15 to 1.41 mils (0.029 to 0.036 mm).

The films on the quartz slides are weathered according to the following conditions in Xenon Arc Weather-Ometer with a controlled irradiance at 6500 W, using inner quartz and outer borosilicate S-type filter. The irradiation cycle is as follows: 40 minutes of straight irradiation with no water spray, followed by 20 minutes of light plus front spray, followed by 60 minutes of light irradiation and finally by 60 minutes dart plus rear spray (condensation). The setting is at 0.55 W/M$^2$ at 340 nm, 1.98 kJ/hour. In the light cycle the black panel temperature is controlled at 70±2° C. The relative humidity in the light cycle is in the range of 50–55% and in the dark cycle 100%. The absorbance of the long wavelength UV band as a function of Xenon arc weathering hours are recorded in the table below.

To follow the loss of UV absorbers from the clear coats, UV spectra are measured initially and after weathering at regular time intervals. The UV spectrophotometer measures absorbance linearly up to 5.5 absorbance units using a reference beam attenuation technique.

It is assumed that the degradation products from the UV absorber do not contribute to the UV spectrum. This is tested by following the ratio of absorbance of the band at about 300 nm and the band at about 340 nm. The ratio does not change upon weathering the sample, This suggests that the UV spectrum of the weathered films correspond to the amount of UV absorber remaining in the film with very little if any contribution to the spectrum by photo degradants.

The data in the table below are based on formula A after 1211 hours of exposure of the clear coats containing the test benzotriazole UV absorbers.

| Compound | Units Absorbance Loss | G$_2$ | R$_1$ | R$_2$* |
|---|---|---|---|---|
| A | 1.7982 | hydrogen | -PO(OEt)$_2$ | tert-octyl |
| B | 1.6300 | hydrogen | nitro | tert-octyl |
| C | 1.4863 | phenyl-S- | tert-butyl | group I |
| D | 1.4002 | hydrogen | hydrogen | group II |
| E | 1.1872 | methoxy | tert-butyl | methyl |
| F | 0.5259 | hydrogen | tert-butyl | group II |
| G | 0.4527 | hydrogen | hydrogen | α-cumyl |
| H | 0.4420 | hydrogen | tert-butyl | group I |
| I | 0.4299 | hydrogen | tert-octyl | α-cumyl |
| J | 0.4134 | hydrogen | hydrogen | tert-octyl |
| K | 0.3777 | hydrogen | tert-octyl | tert-octyl |
| L | 0.3712 | hydrogen | tert-butyl | CH$_2$CH$_2$CH$_2$OH |
| M | 0.3433 | hydrogen | α-cumyl | group II |
| N | 0.3098 | cyano | tert-butyl | tert-butyl |
| O | 0.2689 | phenyl-SO$_2$- | tert-butyl | group I |
| P | 0.2576 | hydrogen | α-cumyl | α-cumyl |
| Q | 0.2492 | hydrogen | α-cumyl | tert-octyl |

*Group I is -CH$_2$CH$_2$COOC$_8$H$_{17}$
Group II is -CH$_2$CH$_2$COOCH$_3$

Inspection of these data leads to some clear conclusions about the photostability of 2H-benzotriazole UV absorbers and about the nature of the substitution which will affect that photostability.

Increased photostability occurs when R$_1$ is α-cumyl or phenyl and when G$_2$ is an electron withdrawing group such as phenyl-sulfonyl or cyano.

The nature of the R$_2$ group has less influence on the photostability of the benzotriazole UV absorbers.

From these observations, then an idealized benzotriazole UV absorber might theoretically be designed where G$_2$ is an electron withdrawing group, R$_1$ is an effective bulky group, and R$_2$ is a thermally stable moiety. One such idealized compound might be a benzotriazole where G$_2$ is phenylsulfonyl, R$_1$ is α-cumyl and R$_2$ is tert-octyl. This benzotriazole is generically claimed in U.S. Pat. No. 5,280,124. The data given in Example 30 below confirms this prediction and this "idealized" compound does indeed exhibit a very low loss rate well below the present state of the art.

EXAMPLE 40

Following the general procedure of Example 39, a number of additional benzotriazole test compounds are incorporated into a high solids thermoset acrylic melamine resin at such concentrations between 1.93 and 3% by weight to give equal molar concentrations of test benzotriazole in equal film thickness, and sufficient to give a starting absorbance of approximately 2.0 absorbance units.

The test discs are exposed in a Xenon-Arc Weather-Ometer at X180 cycle (0.45 Watts/M$^2$). The initial UV absorbance is measured followed by measurements at roughly 250 hour intervals for the first 2000 hours and every 500 hours thereafter. Each clear coat also contains 1% by weight of a hindered amine light stabilizer, bis-(1-octyloxy-2,2,6,6-tetramethylpiperidin-4-yl) sebacate, as well.

The data in the table below are based on compounds of formula A after 1253 hours of exposure of the clear coats containing the test benzotriazole UV absorbers.

| Compound | Units Absorbance Loss | $G_2$ | $R_1$ | $R_2$ |
| --- | --- | --- | --- | --- |
| R | 0.2424 | hydrogen | phenyl | α-cumyl |
| Q | 0.2351 | hydrogen | α-cumyl | tert-octyl |
| S | 0.1271 | $CF_3$ | α-cumyl | tert-octyl |
| T | 0.1827 | phenyl-$SO_2$ | tert-butyl | tert-butyl |

The data in the table below are based on compounds of formula A after 1489 hours of exposure of the clear coats containing the test benzotiazole UV absorbers.

| Compound | Units Absorbance Loss | $G_2$ | $R_1$ | $R_2$ |
| --- | --- | --- | --- | --- |
| R | 0.3724 | hydrogen | phenyl | α-cumyl |
| Q | 0.287 | hydrogen | α-cumyl | tert-octyl |
| S | 0.1547 | $CF_3$ | α-cumyl | tert-octyl |
| T | 0.2654 | phenyl-$SO_2$ | tert-butyl | tert-butyl |

The data in the table below are based on compounds of formula A after 2521 hours of exposure of the clear coats containing the test benzotriazole UV absorbers.

| Compound | Units Absorbance Loss | $G_2$ | $R_1$ | $R_2$ |
| --- | --- | --- | --- | --- |
| R | 0.4824 | hydrogen | phenyl | α-cumyl |
| Q | 0.4054 | hydrogen | α-cumyl | tert-octyl |
| S | 0.2192 | $CF_3$ | α-cumyl | tert-octyl |
| T | 0.3570 | phenyl-$SO_2$ | tert-butyl | tert-butyl |

It is clear from the three tables above that Compounds S and especially T which have an electron withdrawing group at the 5-position of the benzo ring are significantly more durable than benzotriazoles which do not have such a group on the benzo ring.

The data in the table below are based on compounds of formula A after 1264 hours of exposure of the clear coats containing the test benzotriazole UV absorbers.

| Compound | Units Absorbance Loss | $G_2$ | $R_1$ | $R_2$ |
| --- | --- | --- | --- | --- |
| Q | 0.2293 | hydrogen | α-cumyl | tert-octyl |
| S | 0.0921 | $CF_3$ | α-cumyl | tert-octyl |
| T | 0.1965 | phenyl-$SO_2$ | tert-butyl | tert-butyl |
| U | 0.0944 | phenyl-$SO_2$ | α-cumyl | tert-octyl |
| V | 0.1719 | chloro | α-cumyl | tert-octyl |
| W | 0.1655 | fluoro | α-cumyl | tert-octyl |
| X | 0.1796 | hydrogen | phenyl | tert-octyl |

The data in the table below are based on compounds of formula A after 1518 hours of exposure of the clear coats containing the test benzotriazole UV absorbers.

| Compound | Units Absorbance Loss | $G_2$ | $R_1$ | $R_2$ |
| --- | --- | --- | --- | --- |
| Q | 0.2662 | hydrogen | α-cumyl | tert-octyl |
| S | 0.1116 | $CF_3$ | α-cumyl | tert-octyl |
| T | 0.2423 | phenyl-$SO_2$ | tert-butyl | tert-butyl |
| U | 0.1114 | phenyl-$SO_2$ | α-cumyl | tert-octyl |
| V | 0.1955 | chloro | α-cumyl | tert-octyl |
| W | 0.1668 | fluoro | α-cumyl | tert-octyl |
| X | 0.2220 | hydrogen | phenyl | tert-octyl |

The data in these tables clearly show that benzotriazoles substituted by an electron withdrawing group on the benzo ring, particularly a group such as trifluoromethyl or phenylsulfonyl, are especially durable as measured by low loss rate absorbance values after exposure to actinic radiation. Compounds S, U, V and W are especially durable and fit the profile proposed above. Indeed, the prediction that Compound U would be particularly durable is borne out by the data above. Inspection of the data for compounds T and U shows the added beneficial effect of having an effective bulky group such as α-cumyl at the $R_1$ position compared to a mere alkyl moiety such as tert-butyl at that position.

What is claimed is:

1. A coating composition, stabilized with a benzotriazole, which benzotriazole exhibits enhanced durability and a low loss rate when incorporated in said coating, which composition comprises (a) a resin selected from the group consisting of a thermoset acrylic melamine resin, an acrylic urethane resin, an epoxy carboxy resin, a silane modified acrylic melamine, an acrylic resin with carbamate pendant groups crosslinked with melamine or an acrylic polyol resin crosslinked with melamine containing carbamate groups, and (b) 0.01 to 5% by weight, based on resin solids, of a benzotriazole of formula A, B, C or D

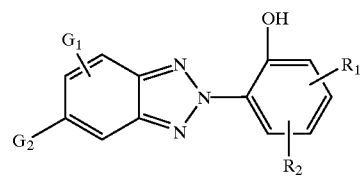

(A)

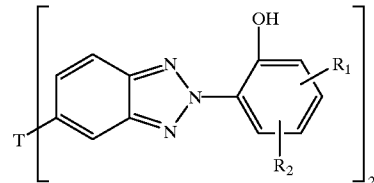

(B)

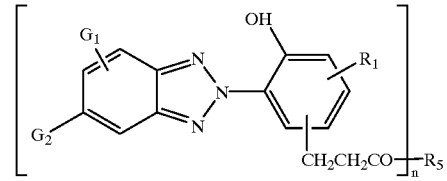

(C)

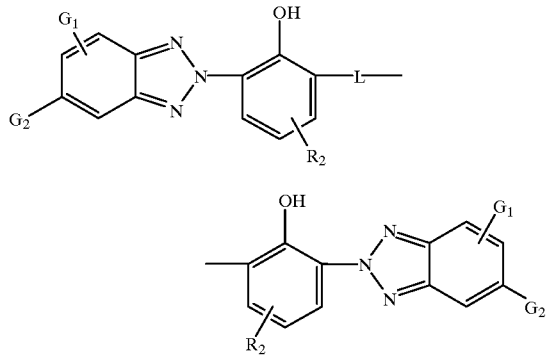

wherein

G$_1$, G$_2$ or T is an electron withdrawing radical,

G$_1$ is hydrogen or halogen,

G$_2$ is halogen, nitro, cyano, R$_3$SO—, R$_3$SO$_2$—, —COOG$_3$, CF$_3$—, —P(O)(C$_6$H$_5$)$_2$, —CO—G$_3$, —CO—NH—G$_3$, —CO—N(G$_3$)$_2$, —N(G$_3$)—CO—G$_3$,

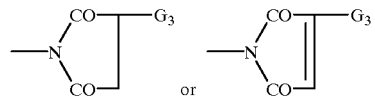

G$_3$ is hydrogen, straight or branched chain alkyl of 1 to 24 carbon atoms, straight of branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, R$_1$ is hydrogen, straight or branched chain alkyl of 1 to 24 carbon atoms, straight of branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, R$_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or R$_2$ is hydroxyl or —OR$_4$ where R$_4$ is straight or branched chain alkyl of 1 to 24 carbon atoms; or said alkyl substituted by one or more —OH, —OCO—R$_{11}$, —OR$_4$, —NCO or —NH$_2$ groups or mixtures thereof; or said alkyl or said alkenyl interrupted by one or more —O—, —NH— or —NR$_4$— groups or mixtures thereof and which can be unsubstituted or substituted by one or more —OH, —OR$_4$ or —NH$_2$ groups or mixtures thereof; or R$_2$ is —SR$_3$, —NHR$_3$ or —N(R$_3$)$_2$; or R$_2$ is

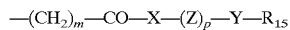

wherein

X is —O— or —N(R$_{16}$)—,

Y is —O— or —N(R$_{17}$)—,

Z is C$_2$–C$_{12}$-alkylene, C$_4$–C$_{12}$-alkylene interrupted by one to three nitrogen atoms, oxygen atoms or a mixture thereof, or is C$_3$–C$_{12}$-alkylene, butenylene, butynylene, cyclohexylene or phenylene, each substituted by a hydroxyl group, m is zero, 1 or 2, p is 1, or p is also zero when X and Y are —N(R$_{16}$)— and —N(R$_{17}$)—, respectively, R$_{15}$ is a group —CO—C(R$_{18}$)=C(H)R$_{19}$ or, when Y is —N(R$_{17}$)—, forms together with R$_{17}$ a group —CO—CH=CH—CO—, wherein R$_{18}$ is hydrogen or methyl, and R$_{19}$ is hydrogen, methyl or —CO—X—R$_{20}$, wherein R$_{20}$ is hydrogen, C$_1$–C$_{12}$-alkyl or a group of the formula

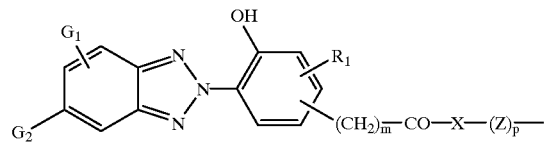

wherein the symbols R$_1$, R$_3$, X, Z, m and p have the meanings defined above, and R$_{16}$ and R$_{17}$ independently of one another are hydrogen, C$_1$–C$_{12}$-alkyl, C$_3$–C$_{12}$-alkyl interrupted by 1 to 3 oxygen atoms, or is cyclohexyl or C$_7$–C$_{15}$aralkyl, and R$_{16}$ together with R$_{17}$ in the case where Z is ethylene, also forms ethylene, n is 1 or 2, when n is 1, R$_5$ is Cl, OR$_6$ or NR$_7$R$_8$, or R$_5$ is —PO(OR$_{12}$)$_2$, —OSi(R$_{11}$)$_3$ or —OCO—R$_{11}$, or straight or branched chain C$_1$–C$_{24}$alkyl which is interrupted by —O—, —S— or —NR$_{11}$ and which can be unsubstituted or substituted by —OH or —OCO—R$_{11}$, C$_5$–C$_{12}$ cycloalkyl which is unsubstituted or substituted by —OH, straight chain or branched C$_2$–C$_{18}$alkenyl which is unsubstituted or substituted by —OH, C$_7$–C$_{15}$aralkyl, —CH$_2$—CHOH—R$_{13}$ or glycidyl, R$_6$ is hydrogen, straight or branched chain C$_1$–C$_{24}$alkyl which is unsubstituted or substituted by one or more OH, OR$_4$ or NH$_2$ groups, or —OR$_6$ is —(OCH$_2$CH$_2$)$_w$OH or —(OCH$_2$CH$_2$)$_w$OR$_{21}$ where w is 1 to 12 and R$_{21}$ is alkyl of 1 to 12 carbon atoms, R$_7$ and R$_8$ are independently hydrogen, alkyl of 1 to 18 carbon atoms, straight or branched chain C$_3$–C$_{18}$alkyl which is interrupted by —O—, —S— or —NR$_{11}$—, C$_5$–C$_{12}$cycloalkyl, C$_6$–C$_{14}$aryl or C$_1$–C$_3$hydroxylalkyl, or R$_7$ and R$_8$ together with the N atom are a pyrrolidine, piperidine, piperazine or morpholine ring, when n is 2, R$_5$ is one of divalent radicals —O—R$_9$—O— or —N(R$_{11}$)—R$_{10}$—N(R$_{11}$)—, R$_9$ is C$_2$–C$_8$alkylene, C$_4$–C$_8$alkenylene, C$_4$alkynylene, cyclohexylene, straight or branched chain C$_4$–C$_{10}$alkylene which is interrupted by —O— or by —CH$_2$—CHOH—CH$_2$—O—R$_{14}$—O—CH$_2$—CHOH—CH$_2$—, R$_{10}$ being straight or branched chain C$_2$–C$_{12}$alkylene which may be interrupted by —O—, cyclohexylene, or

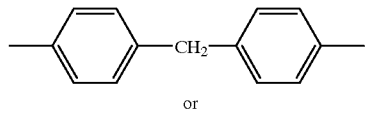

-continued

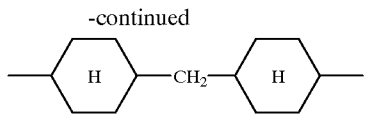

or $R_{10}$ and $R_{11}$ with the two nitrogen atoms form a piperazine ring, $R_{14}$ is straight or branched chain $C_2$–$C_8$alkylene, straight or branched chain $C_4$–$C_{10}$alkylene which is interrupted by —O—, cycloalkylene, arylene or

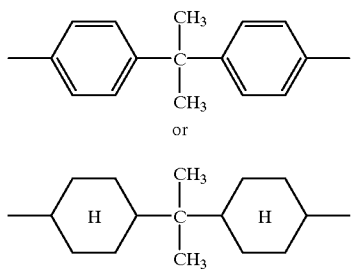

where $R_7$ and $R_8$ are independently hydrogen, alkyl of 1 to 18 carbon atoms or $R_7$ and $R_8$ together are alkylene of 4 to 6 carbon atoms, 3-oxapentamethylene, 3-iminopentamethylene or 3-methyliminopentamethylene, $R_{11}$ is hydrogen, straight or branched chain $C_1$–$C_{18}$alkyl, $C_5$–$C_{12}$cycloalkyl, straight or branched chain $C_3$–$C_8$alkenyl, $C_6$–$C_{14}$aryl or $C_7$–$C_{15}$aralkyl, $R_{12}$ is straight or branched chain $C_1$–$C_{18}$alkyl, straight or branched chain $C_3$–$C_{18}$alkenyl, $C_5$–$C_{10}$cycloalkyl, $C_6$–$C_{16}$aryl or $C_7$–$C_{15}$aralkyl, $R_{13}$ is H, straight chain or branched $C_1$–$C_{18}$alkyl which is substituted by —PO(OR$_{12}$)$_2$, phenyl which is unsubstituted or substituted by OH, $C_7$–$C_{15}$aralkyl or —CH$_2$OR$_{12}$, $R_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, L is alkylene of 1 to 12 carbon atoms, alkylidene of 2 to 12 carbon atoms, benzylidene, p-xylylene or cycloalkylidene, and T is —SO—, —SO$_2$—, —SO—E—SO—, —SO$_2$—E—SO$_2$—, —CO—, —CO—E—CO—, —COO—E—OCO—, —CO—NG$_3$—E—NG$_3$—CO— or —NG$_3$—CO—E—CO—NG$_3$—, where E is alkylene of 2 to 12 carbon atoms, cycloalkylene of 5 to 12 carbon atoms, or alkylene interrupted or terminated by cyclohexylene of 8 to 12 carbon atoms, which benzotriazole exhibits enhanced durability and low loss rate values when the coating is exposed to actinic radiation as witnessed by a loss of less than 0.22 absorbance units after exposure for 1200 hours, or less than 0.27 absorbance units after 1500 hours exposure, or less than 0.40 absorbance units after 2500 hours exposure in a Xenon-Arc Weather-Ometer, and with the proviso that the benzotriazole is not (a) 5-n-dodecylsulfonyl-2-(2-hydroxy-3,5-di-tert-butylphenyl)-2H-benzotriazole;

(b) 5-benzenesulfinyl-2-(2-hydroxy-3,5-di-tert-butylphenyl)-2H-benzotriazole;

(c) 5-benzenesulfonyl-2-(2-hydroxy-3,5-di-tert-butylphenyl)-2H-benzotriazole;

(d) 5,5'-sulfonylbis[2-(2-hydroxy-3,5-di-tert-butylphenyl)-2H-benzotriazole];

(e) 5-benzenesulfonyl-2-[2-hydroxy-3-tert-butyl-5-(2-octyloxycarbonylethyl)-phenyl]-2H-benzotriazole;

(f) 5-benzenesulfonyl-2-[2-hydroxy-3-tert-butyl-5-(3-hydroxypropyl)phenyl]-2H-benzotriazole;

(g) 3-(5-benzenesulfonyl-2H-benzotriazol-2-yl)-5-tert-butyl-4-hydroxyhydrocinnamic acid;

(h) 3-(5-benzenesulfonyl-2H-benzotriazol-2-yl)-5-tert-butyl-4-hydroxyhydrocinnamamide;

(i) an isomeric mixture of 3-[3-(5-benzenesulfonyl-2H-benzotriazol-2-yl)-5-tert-butyl-4-hydroxyhydrocinnamoyloxy]-2-hydroxypropyl methacrylate and 2-[3-(5-benzenesulfonyl-2H-benzotriazol-2-yl)-5-tert-butyl-4-hydroxyhydrocinnamoyloxy]-3-hydroxypropyl methacrylate; or (j) 5-benzenesulfonyl-2-{2-hydroxy-3-tert-butyl-5-[2-(ω-hydroxy-octa(ethyleneoxy)-carbonylethyl]phenyl}-2H-benzotriazole.

2. A composition according to claim 1 wherein component (b) is a compound of formula A'

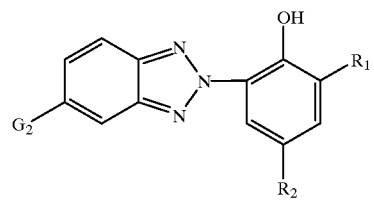

(A')

wherein $G_2$ is fluoro, chloro, cyano, $R_3SO_2$—, $CF_3$—, —CO—$G_3$, —COO—$G_3$ or —CO—N($G_3$)$_2$ $G_3$ is alkyl of 1 to 12 carbon atoms, $R_1$ is hydrogen, alkyl of 1 to 12 carbon atoms, phenyl, phenylalkyl of 7 to 15 carbon atoms or said phenyl or said phenylalkyl substituted on the phenyl ring by 1 or 2 alkyl groups of 1 to 4 carbon atoms, $R_2$ is alkyl of 1 to 12 carbon atoms, phenyl, phenylalkyl of 7 to 15 carbon atoms or —CH$_2$CH$_2$COOG$_4$ where $G_4$ is hydrogen, alkyl of 1 to 24 carbon atoms or said alkyl substituted by OH, interrupted by one to six —O— atoms or both substituted by OH and interrupted by one to six —O— atoms, and $R_3$ is alkyl of 1 to 18 carbon atom, aryl of 6 to 10 carbon atoms or said aryl substituted one or two alkyl of 1 to 4 carbon atoms.

3. A composition according to claim 2 where in the compound of formula A'

$G_2$ is fluoro, chloro, cyano, $R_3SO_2$—, $CF_3$—, —COO—$G_3$ or —CO—N($G_3$)$_2$, $G_3$ is alkyl of 1 to 8 carbon atoms, $R_1$ is hydrogen, phenyl or α-cumyl, $R_2$ is alkyl of 4 to 12 carbon atoms or phenyl, and $R_3$ is phenyl or alkyl of 8 to 12 carbon atoms.

4. A composition according to claim 3 wherein $G_2$ is phenyl—SO$_2$—, octyl—SO$_2$—, fluoro or CF$_3$—, $R_1$ is α-cumyl or phenyl, and $R_2$ is tert-butyl or tert-octyl.

5. A composition according to claim 1 wherein component (a) is a resin which is a thermoset acrylic melamine resin or an acrylic urethane resin.

6. A composition according to claim 1 which additionally contains a stabilizing amount of a phenolic antioxidant selected from the group consisting of n-octadecyl 3,5-di-tert-butyl-4-hydroxyhydrocinnamate, neopentanetetrayl tetrakis(3,5-di-tert-butyl-4-hydroxyhydrocinammate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3,-tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3, 5-di-tert-butyl-4-hydroxybenzyl)mesitol, hexamethylene bis (3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxuphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis [2-(3,5-di-tert-butyl-4-hydroxyhydrocinnamoyloxy)-ethyl]-oxamide.

7. A composition according to claim 6 wherein the phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris (3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol or 2,2'-ethylidene-bis(4,6-di-tert-butylphenol).

8. A composition according to claim 1 which additionally contains an effective stabilizing amount of a hindered amine selected from the group consisting of bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, 4-benzoyl-2,2,6,6-tetramethylpiperidine, 4-stearyloxy-2,2,6,6-tetramethylpiperidine, 3-n-octyl-7,7,9,9-tetramethyl-1,3,8-triaza-spiro[4.5]decane-2,4-dione, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2] heneicosane, polycondensation product of 2,4-dichloro-6-tert-octylamino-s-triazine and 4,4'-hexamethylenebis (amino-2,2,6,6- tetrame thylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidine) and 1,2-dibromoethane, tetrakis(2,2,6,6-tetramethylpiperidin-4-yl) 1,2,3,4-butanetetracarboxylate, tetrakis(1,2,2,6,6-pentamethylpiperidin-4-yl) 1,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N'',N'''-tetrakis[(4,6-bis(butyl-1,2,2,6,6-pentamethyl-piperidin-4-yl)-amino-s-triazin-2-yl]-1,10-diamino-4,7-diazadecan e, mixed [2,2,6,6-tetramethylpiperidin-4-yl/β,β, β',β'-tetramethyl-3,9-(2,4,8,10-tetraoxaspiro[5.5]-undecane) diethyl]1,2,3,4-butanetetracarboxylate, mixed [1,2,2,6,6-pentamethylpiperidin-4-yl/ β,β,β',β'-tetramethyl-3,9-(2,4,8, 10-tetraoxaspiro[5.5]-undecane)diethyl]1,2,3,4-butanetetracarboxylate, octamethylene bis(2,2,6,6-tetramethyl-piperidin-4-carboxylate), 4,4'-ethylenebis(2,2, 6,6-tetramethylpiperazin-3-one), N-2,2,6,6-tetramethyl-piperidin-4-yl-n-dodecylsuccinimide, N-1,2,2,6,6-pentamethyl-piperidin-4-yl-n-dodecylsuccinimide, N-1-acetyl-2,2,6,6-tetramethylpiperidin-4-yln-dodecylsuccinimide, 1-acetyl3-dodecyl-7,7,9,9-tetramethyl-1,3,8-triazaspiro[4.5]decane-2,4-dione, di-(1-octyloxy-2,2, 6,6-tetramethylpiperidin-4-yl) sebacate, di-(1-cyclohexyloxy-2,2,6,6-tetra-methylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], and 2,4,6-tris[N-(1-cyclohexyloxy-2,2,6,6-tetramethylpiperidin-4-yl)-n-butylamino]-s-triazine.

9. A composition according to claim 8 wherein the hindered amine is bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine), N,N',N'',N'''-tetrakis[(4,6-bis(butyl-(1,2,2,6,6-pentamethyl-piperidin-4-yl)amino)-s-triazine-2-yl]-1,10-diamino-4,7-diazadecane, di-(1-octyloxy-2,2,6,6-tetramethylpiperidin-4-yl) sebacate, di-(1-cyclohexyloxy-2, 2,6,6-tetramethylpiperidin-4-yl) succinate, 1-octyloxy-2,2, 6,6-tetramethyl-4-hydroxy-piperidine, poly-{[6-tert-octylamino-s-triazin-2,4-diyl][2-(1-cyclohexyloxy-2,2,6,6,-tetramethylpiperidin-4-yl)imino-hexamethylene-[4-(1-cyclohexyloxy-2,2,6,6-tetramethylpiperidin-4-yl)imino], or 2,4,6-tris[N-(1-cyclohexyloxy-2,2,6,6-tetramethylpiperidin-4-yl)-n-butylamino]-s-triazine.

10. A composition according to claim 1 which additionally contains another UV absorber selected from the group consisting of the s-triazines, the oxanilides, the hydroxybenzophenones, benzoates and the α-cyanoacrylates.

11. A composition according to claim 10 wherein the composition additionally contains an s-triazine which is 2,4-bis(2,4-dimethylphenyl)-6-(2-hydroxy-4-octyloxyphenyl)-s-triazine;

2,4-diphenyl-6-(2-hydroxy-4-hexyloxyphenyl)-s-triazine;

2,4-bis(2,4-dimethylphenyl)-6-[2-hydroxy-4-(3-do-/tridecyloxy-2-hydroxypropoxy)-phenyl]-s-triazine; or 2-(2-hydroxyethylamino)-4,6-bis[N-butyl-N-(1-cyclohexyloxy-2,2,6,6-tetramethyl-piperidin-4-yl) amino]-s-triazine.

12. A composition according to claim 1 which additionally contains an effective stabilizing amount of at least one other 2-hydroxyphenyl-2H-benzotriazole UV absorber.

13. A composition according to claim 12 wherein the other 2-hydroxyphenyl-2H-benzo-triazole is selected from the group consisting of 2-(2-hydroxy-5-methylphenyl)-2H-benzotriazole;

2-(2-hydroxy-3,5-di-tert-butylphenyl)-2H-benzotriazole;

2-(2-hydroxy-5-tert-butylphenyl)-2H-benzotriazole;

2-(2-hydroxy-5-tert-octylphenyl)-2H-benzotriazole;

5-chloro-2-(2-hydroxy-3,5-di-tert-butylphenyl)-2H-benzotriazole;

5-chloro-2-(2-hydroxy-3-tert-butyl-5-methylphenyl)-2H-benzotriazole;
2-(2-hydroxy-3-sec-butyl-5-tert-butylphenyl)-2H-benzotriazole;
2-(2-hydroxy-4-octyloxyphenyl)-2H-benzotriazole;
2-(2-hydroxy-3-dodecyl-5-methylphenyl)-2H-benzotriazole;
2-(2-hydroxy-3,5-di-tert-amylphenyl)-2H-benzotriazole;
2-[2-hydroxy-3,5-di($\alpha,\alpha$-dimethylbenzyl)phenyl]-2H-benzotriazole;
2-[2-hydroxy-3-($\alpha,\alpha$-dimethylbenzyl)-5-tert-octylphenyl]-2H-benzotriazole;
2-{2-hydroxy-3-tert-butyl-5-[2-(omega-hydroxy-octa(ethyleneoxy)carbonyl)ethyl]-phenyl}-2H-benzotriazole; and
2-{2-hydroxy-3-tert-butyl-5-[2-(octyloxy)carbonyl)ethyl]phenyl}-2H-benzotriazole.

14. A composition according to claim 13 wherein the other benzotriazole is 2-(2-hydroxy-3,5-di-tert-amylphenyl)-2H-benzotriazole;
2-[2-hydroxy-3,5-di($\alpha,\alpha$-dimethyl-benzyl)phenyl]-2H-benzotriazole;
2-[2-hydroxy-3-($\alpha,\alpha$-dimethylbenzyl)-5-tert-octylphenyl]-2H-benzotriazole;
2-{2-hydroxy-3-tert-butyl-5-[2-(omega-hydroxy-octa(ethyleneoxy)carbonyl)ethyl]-phenyl}-2H-benzotriazole; and
2-{2-hydroxy-3-tert-butyl-5-[2-(octyloxy)carbonyl)ethyl]phenyl}-2H-benzotriazole.

* * * * *

UNITED STATES PATENT AND TRADEMARK OFFICE
CERTIFICATE OF CORRECTION

PATENT NO. : 5,977,219  
APPLICATION NO. : 08/961127  
DATED : November 2, 1999  
INVENTOR(S) : Ramanathan Ravichandran et al.

It is certified that error appears in the above-identified patent and that said Letters Patent is hereby corrected as shown below:

Title page,
Item (60) should read:

-- Related U.S. Application Data

(60) This application claims benefit of application No. 08/745,146, filed on Nov. 7, 1996, which was converted to Provisional application No. 60/367,382. --.

Column 1,
After the title, insert the lineage paragraph:

-- This application claims benefit under 35 USC 119(e) of U.S. application Ser. No. 08/785,146, filed on November 7, 1996 and converted into a Provisional Application Ser. No. 60/367,382 by petition under 37 CFR 1.53(b)(2)(ii), filed on May 23, 1997, and granted on Aug. 7, 1997. --.

Signed and Sealed this

Twenty-second Day of January, 2008

JON W. DUDAS  
*Director of the United States Patent and Trademark Office*